United States Patent
Lynn et al.

(10) Patent No.: US 8,799,079 B2
(45) Date of Patent: Aug. 5, 2014

(54) SYSTEM FOR PRIORITIZING ADVERTISER COMMUNICATIONS OVER A NETWORK

(75) Inventors: Scott W. Lynn, Kansas City, MO (US); Travis W. Tisa, Webster, NY (US); Kevin Eppinger, Kansas City, MO (US)

(73) Assignee: Adknowledge, Inc., Kansas City, MO (US)

( * ) Notice: Subject to any disclaimer, the term of this patent is extended or adjusted under 35 U.S.C. 154(b) by 1314 days.

(21) Appl. No.: 11/256,871

(22) Filed: Oct. 24, 2005

(65) Prior Publication Data

US 2006/0248110 A1 Nov. 2, 2006

Related U.S. Application Data

(60) Provisional application No. 60/621,412, filed on Oct. 22, 2004.

(51) Int. Cl.
*G06Q 30/00* (2012.01)
*G06Q 30/02* (2012.01)

(52) U.S. Cl.
CPC ................................. *G06Q 30/02* (2013.01)
USPC ................ 705/14.71; 705/14.72; 705/14.73

(58) Field of Classification Search
CPC ................................................. G06Q 30/02
USPC ......... 705/14, 10, 7.37, 7.41, 14.71; 707/102, 707/999.102
See application file for complete search history.

(56) References Cited

U.S. PATENT DOCUMENTS

| | | | | |
|---|---|---|---|---|
| 5,710,887 A * | 1/1998 | Chelliah et al. | ................. | 705/26 |
| 6,269,361 B1 * | 7/2001 | Davis et al. | ........................ | 707/3 |
| 6,466,918 B1 * | 10/2002 | Spiegel et al. | ................... | 705/27 |
| 6,480,830 B1 * | 11/2002 | Ford et al. | ......................... | 705/9 |
| 6,961,712 B1 * | 11/2005 | Perkowski | ...................... | 705/27 |
| 7,136,871 B2 * | 11/2006 | Ozer et al. | ............................ | 1/1 |
| 7,191,210 B2 * | 3/2007 | Grossman | ..................... | 709/203 |
| 7,231,395 B2 * | 6/2007 | Fain et al. | ..................... | 707/101 |
| 7,657,555 B2 * | 2/2010 | Rorex et al. | ............ | 707/999.102 |
| 7,711,598 B2 * | 5/2010 | Perkowski | ...................... | 705/26 |
| 2001/0051940 A1 * | 12/2001 | Soulanille | .......................... | 707/3 |
| 2002/0026360 A1 * | 2/2002 | McGregor et al. | .............. | 705/14 |
| 2002/0053076 A1 * | 5/2002 | Landesmann | ................... | 725/10 |
| 2002/0165849 A1 * | 11/2002 | Singh et al. | ...................... | 707/1 |
| 2002/0169760 A1 * | 11/2002 | Cheung et al. | .................... | 707/3 |
| 2003/0009385 A1 * | 1/2003 | Tucciarone et al. | ............ | 705/26 |
| 2003/0014414 A1 * | 1/2003 | Newman | ......................... | 707/10 |
| 2003/0033292 A1 * | 2/2003 | Meisel et al. | ..................... | 707/3 |
| 2003/0093285 A1 * | 5/2003 | Colace et al. | ...................... | 705/1 |
| 2003/0220866 A1 | 11/2003 | Pisaris-Henderson et al. | . | 705/37 |
| 2003/0220912 A1 * | 11/2003 | Fain et al. | ......................... | 707/3 |
| 2004/0003400 A1 * | 1/2004 | Carney et al. | ................... | 725/42 |
| 2004/0162757 A1 * | 8/2004 | Pisaris-Henderson et al. | . | 705/14 |

(Continued)

*Primary Examiner* — John G Weiss
*Assistant Examiner* — Adam Chornesky
(74) *Attorney, Agent, or Firm* — Meunier Carlin & Curfman, LLC

(57) ABSTRACT

A user creates an advertising campaign by selecting categories and building communications associated with the requisite categories selected. Each user places a bid amount on each category and when the requisite category is selected, the communications associated with the highest bid amounts are sent to recipients, typically over e-mail and/or web channels. The communications typically include text and a link, that includes the uniform resource locator (URL) of a targeted web sire associated with the user, such that when the recipient user activates the link, the browser of the recipient is directed to the targeted web site of the user.

56 Claims, 27 Drawing Sheets

(56) References Cited

U.S. PATENT DOCUMENTS

| | | | |
|---|---|---|---|
| 2005/0075932 A1* | 4/2005 | Mankoff | 705/14 |
| 2005/0108113 A1* | 5/2005 | Wittsche | 705/27 |
| 2006/0010134 A1* | 1/2006 | Davis et al. | 707/10 |
| 2006/0069613 A1* | 3/2006 | Marquardt | 705/14 |
| 2006/0235873 A1* | 10/2006 | Thomas | 707/102 |
| 2006/0248110 A1* | 11/2006 | Lynn et al. | 707/102 |
| 2006/0253434 A1* | 11/2006 | Beriker et al. | 707/3 |
| 2010/0070340 A1* | 3/2010 | Jerome | 705/10 |
| 2010/0161400 A1* | 6/2010 | Snodgrass et al. | 705/14.16 |
| 2013/0041764 A1* | 2/2013 | Donovan et al. | 705/14.73 |
| 2013/0073683 A1* | 3/2013 | Davis et al. | 709/218 |

\* cited by examiner

ACCOUNT INFORMATION

CONTACT NAME
   CONTACT ADDRESS
   CONTACT PHONE
   E-MAIL
   PASSWORD
   E-MAIL PREFERENCES
NAME OF CAMPAIGN
ACCEPTANCE OF TERMS
   NAME
   INITIALS
CREATIVE FOR CATEGORIES
CREATIVE ASSETS
   TEXT
   URL
CATEGORIES
CHANNELS
   WEB
   E-MAIL
WEB-AMOUNT FOR A CLICK
E-MAIL-AMOUNT FOR A CLICK
DAILY BUDGET
CAMPAIGN BUDGET

| Category | Maximum CPCs: | | | | | | |
|---|---|---|---|---|---|---|---|
| | Email Channel $ 10.31 USD | | | Web Channel $ 3.92 USD | | | |
| | Average Clicks/Day | Average Cost/Click | Estimated Cost/Day | Average Clicks/Day | Average Cost/Click | Estimated Cost/Day | |
| Business >> Financial Services >> Insurance >> Auto Insurance | 0 | $0.00 | $0.00 | 144 | $0.64 | $91.58 | Remove Category |
| Shopping >> Vehicles >> Auto >> Auto loans | 68 | $0.89 | $60.14 | 232 | $0.72 | $167.33 | Remove Category |
| Shopping >> Vehicles >> Auto >> Auto Warranty | 4 | $0.57 | $2.05 | 7 | $1.36 | $9.00 | Remove Category |
| Shopping >> Vehicles >> Parts and Accessories >> Auto Accessories | 196 | $0.66 | $128.97 | 0 | $0.00 | $0.00 | Remove Category |
| Shopping >> Vehicles >> Parts and Accessories >> Auto parts | 68 | $0.34 | $23.25 | 0 | $0.00 | $0.00 | Remove Category |
| Society >> Philanthropy >> Free Donations >> Automobile Donation | 282 | $1.45 | $409.44 | 10 | $2.37 | $24.57 | Remove Category |
| Summary | 618 | $1.01 | $623.85 | 393 | $0.74 | $292.48 | |

Recalculate Estimates

Modify Category Choices

Daily Campaign Budget

Daily Budget: $ 1145.41 USD

Campaign Budget Cap: $ 10000.00 USD
The overall Maximum amount you're willing to spend for this campaign.
Optional.

FIG. 8

SYSTEM FOR PRIORITIZING ADVERTISER COMMUNICATIONS OVER A NETWORK

CROSS-REFERENCES TO RELATED APPLICATIONS

This patent application is related to and claims priority from U.S. Provisional Patent Application Ser. No. 60/621,412, entitled: Bid-Based Placement For Search Engine Advertisers Within Banners, E-mail and Software, filed on Oct. 22, 2004. U.S. Provisional Patent Application Ser. No. 60/621,412 is incorporated by reference in its entirety herein.

FIELD OF THE INVENTION

The present invention relates to Internet advertising. In particular, the present invention relates to a system for creating advertising communications, that incorporates a bidding engine, that distributes advertising communications in accordance with a priority order. The priority order is determined by the monetary amounts that the advertiser (who created the advertising communication), will pay the system to direct traffic to a web site, associated with the advertiser.

BACKGROUND OF THE INVENTION

Advertising over the Internet continues to grow, and more businesses are allocating increasing financial resources to attract consumers over the Internet. One way to advertise over the Internet is for search engines, such as Google (www.google.com), Yahoo (www.yahoo.com), Gopher, Dogpile, Ask Jeeves, Alta Vista, and others, is to display listings associated with words, known as keywords, in a priority order.

Each keyword is typically associated with a listing, to a web site or web page (referred to collectively in this section as a "web site") of a web site promoter (owner, controller, or other party associated with a web site), and typically, multiple listings for individual web sites of corresponding web site promoters. Each of the web site promoters has agreed to pay the search engine a monetary amount for that keyword, when a user enters the keyword, receives the listings, as generated by the search engine, and typically provided to the user in a graphical user interface (GUI) or other similar on-screen display, and the user then activates or "clicks" their pointing device, or mouse, on the desired listing. The user's browser is directed to the target web site, associated with the specific web site promoter. The "click" may be recorded, as well as the "click through", when the user's browser has reached the targeted web site of the web site promoter.

The web site promoter, willing to pay the most amount of money for a user's pointing device or mouse click on a listing associated with the web site promoter, such that the user's browser is directed to a targeted web site associated with the web site promoter, is usually provided with the first or top priority listing for the particular key word, of the listings generated in an on-screen display. This advertising technique is commonly known as pay per click (PPC) advertising.

SUMMARY OF THE INVENTION

This document references terms that are used consistently or interchangeably herein. These terms, including variations thereof, are as follows.

The term "click", "clicks", "click on", "clicks on" involves the activation of a computer pointing apparatus, such as a device commonly known as a mouse, on a location on a computer screen display, that causes an action of the various software and or hardware supporting the computer screen display.

A "web site" is a related collection of World Wide Web (WWW) files that includes a beginning file or "web page" called a home page, and typically, additional files or "web pages". The term "web site" is used collectively to include "web site" and "web page(s)".

A uniform resource locator (URL) is the unique address for a file, such as a web site or a web page, that is accessible on the Internet.

A "click through" occurs when a user clicks on a box over a link, on their computer screen, typically in a communication sent to the user, such that the user's browser (browsing software or browsing application) is directed to a targeted web site, associated with the uniform resource locator (URL) of the link.

A "creative" is an electronic communication, typically an advertising communication, that includes images and text within the image, and a link for the URL of a targeted web site, associated with the owner or other controlling party of the electronic communication. When the link is activated, typically by the user clicking on a box that overlies the link, the user's browser obtains the URL of the targeted web site associated with the owner or other controlling party of the electronic communication, and is directed to the targeted web site, associated with the uniform resource locator (URL) of the link and the party who controls the electronic communication.

A server is typically a remote computer or remote computer system, or computer program therein, that is accessible over a communications medium, such as the Internet, that provides services to other computer programs (and their users), in the same or other computers.

An "engine" is a program or algorithm, that performs a core or essential function for other programs. An engine can be a central or focal program in an operating system, subsystem, or application program that coordinates the overall operation of other programs. It is also used to describe a special-purpose program containing an algorithm that can sometimes be changed.

"Banners" are graphic images that overlay a displayed web page. Banners are commonly in the form of pop-ups, buttons, roll-ups, and other similar on-screen displayed graphics.

The present invention improves on the contemporary art by providing an engine, that distributes electronic communications, for example, creatives, in electronic mails (hereinafter referred to as e-mail or e-mails), graphical banners, or software, to users along a network, for example, the Internet. The creatives are communications, for example, advertising communications that include images with text-based listings, the text based listings including text, of a headline or title, and one or more descriptions, and a URL of a targeted web site. The creatives are distributed to users (computers and the like linked to the network, typically, the Internet), according to a priority order. The priority order is determined by the monetary amount a party who owns or is associated with a web site, for example, an advertiser, will pay to the system for a user's click on a link, embedded in the creative (typically under a clickable box), to the advertiser's targeted web site. This click activates the link, such that the user's browser is directed to the advertiser's targeted web site. Once the user's browser has acquired the URL of the targeted web site and has been directed to the targeted web site, there has been a click through event or click through (defined above). The monetary amounts are established by the advertisers, who enter amounts or bids for categories, associated with their creatives, when building their campaigns.

The present invention is also directed to an automated bidding engine, that receives bids for various categories. The invention also incorporates a user interface, typically a graphical user interface (GUI), as it appears as an on-screen display, allowing for advertisers or their designated agents (collectively known as "advertising users"), to create accounts, bid on categories, design their desired advertising communication (commonly known and referred to hereinafter as a "creative"), and manage their accounts.

An embodiment of the invention is directed to a method for distributing electronic communications. The method includes, maintaining a database including at least one category, and maintaining a database with a plurality of at least one communication for the at least one category. Each of the at least one communications is associated with a user and includes a link to direct the browser of a recipient of the at least one communication, to a targeted location, for example, a web site associated with the user. A database of modifiable bid amounts for the at least one category, is also maintained, with each modifiable bid amount corresponding to each of the at least one communications associated with each user. A category is then selected, and, each of the at least one communications associated with each user for the selected category is ordered in accordance with the modifiable bid amounts.

Another embodiment of the invention is directed to a method for distributing electronic communications. The method includes, maintaining a database including a plurality of categories, maintaining a database of modifiable communications, for example, modifiable stock communications, typically for advertising, known as creative assets, including at least one modifiable communication for each category of the plurality of categories. Input is received from users, this input including the designation of at least one category, text, a Uniform Resource Locator (URL) for a targeted web site associated with the user, and a modifiable bid amount for each of the at least one categories designated. The inputted text and the Uniform Resource Locator are provided into the at least one modifiable communication or creative asset to create at least one communication, for example, an advertising communication known as a creative, for the at least one designated category associated with the user. A database is maintained, of the modifiable bid amounts for each at least one category designated by each user, each modifiable bid amount corresponding to each of the at least one communications associated with each user.

Another embodiment of the invention is directed to a system for distributing electronic communications. The system includes, a database including at least one category, and, a database with a plurality of at least one communication for the at least one category. Each of the at least one communications is associated with a user, and includes a link to direct the browser of a recipient of the at least one communication to a targeted location, for example, a web site associated with the user. There is also a database of modifiable bid amounts for the at least one category, each modifiable bid amount corresponding to each of the at least one communications associated with each user, and, a bidding engine for ordering each of the at least one communications associated with each user, in accordance with the modifiable bid amounts, for the at least one category.

Another embodiment of the invention is directed to a system for distributing electronic communications. The system includes, a database including at least one category, and a database with a plurality of at least one communication for the at least one category, with each of the at least one communications in the database associated with a user, and including a link to direct the browser of a recipient of the at least one communication to a targeted location. This link typically includes a uniform resource locator (URL) of the targeted location, for example, a web site associated with the user for whom the at least one communication is associated with. There is also a database of modifiable bid amounts for the at least one category for at least one of an e-mail channel (over which e-mails are sent to e-mail clients) or a web channel (over which banners and the like are sent to web pages), and each modifiable bid amount corresponds to each of the at least one communications associated with each user for at least one of the e-mail channel or the web channel. There is also a bidding engine for ordering each of the at least one communications associated with each user, in accordance with the modifiable bid amounts, for the selected category, for at least one of the e-mail channel or the web channel.

Another embodiment of the invention is directed to a system for distributing electronic communications. The system includes a database including a plurality of categories, and, a database of modifiable communications, including at least one modifiable communication for each category of the plurality of categories. There is a processor programmed to: receive from each user, the designation of at least one category, text, a Uniform Resource Locator for a targeted web site associated with the user, and a modifiable bid amount for each of the at least one categories designated; and, provide the inputted text and the Uniform Resource Locator into the at least one modifiable communication to create at least one communication for the at least determined category associated with the user. There is also a bidding engine configured for: receiving the modifiable bid amounts for each at least one category designated by each user, and each modifiable bid amount corresponds to each of the at least one communications associated with each user; and, ordering each of the at least one communications associated with each user into an order for each category in accordance with the modifiable bid amounts.

Another embodiment of the invention is directed to a programmable storage device readable by a machine, tangibly embodying a program of instructions executable by a machine to perform method steps for distributing electronic communications. The method steps are selectively executed during the time when the program of instructions is executed on the machine. The method steps include, receiving a selection of at least one category, text data, a uniform resource locator, and a modifiable bid amount from each user of a plurality of users; and, placing the text data and the uniform resource locator data into a modifiable communication assigned to the at least one category selected by each user to create a communication associated with the user for the at least one category. A modifiable bid amount is associated with the communication associated with each user for the at least one category, and, each communication associated with each user for the at least one category, is ordered in accordance with the modifiable bid amount.

BRIEF DESCRIPTION OF DRAWINGS

Attention is now directed to the drawing figures, where like numerals or characters indicate corresponding or like components. In the drawings:

FIG. 1C is a diagram of an individual advertiser (advertising user) account in the system of FIG. 1B;

FIG. 3-16 are screen displays that result for the performance of various portions of the method (process) of the flow diagram of FIG. 2;

DETAILED DESCRIPTION

The present invention is directed to a system for building and distributing electronic communications into e-mails, graphical banners, or software, for electronic distribution to users along a network, for example, the Internet. The electronic communications are, for example, advertising communications, that include images with text and links to URLs of targeted web sites, these advertising communications commonly known as "creatives". The creatives are distributed to users (computers and the like linked to the network, typically, the Internet) in graphical banners, e-mails or software, according to a priority order. The priority order is determined by the monetary amount a party associated with the creative, for example, the advertiser who is associated with the particular creative, will pay to the system for a user's click on a link embedded in the creative, typically covered by a box in the creative, to direct the user's browser to a targeted web site associated with the party associated with the creative, for example, the advertiser's web site. This click on the creative (at the box or portion overlying the embedded link), followed by the user's browser being redirected to the URL associated with the targeted web site constitutes a click through event or click through, as defined above. The monetary amounts are established by the parties, for example, advertisers, who control the requisite creatives, who enter amounts or bids for categories, associated with their creatives, when building their campaigns.

Figure 1A:
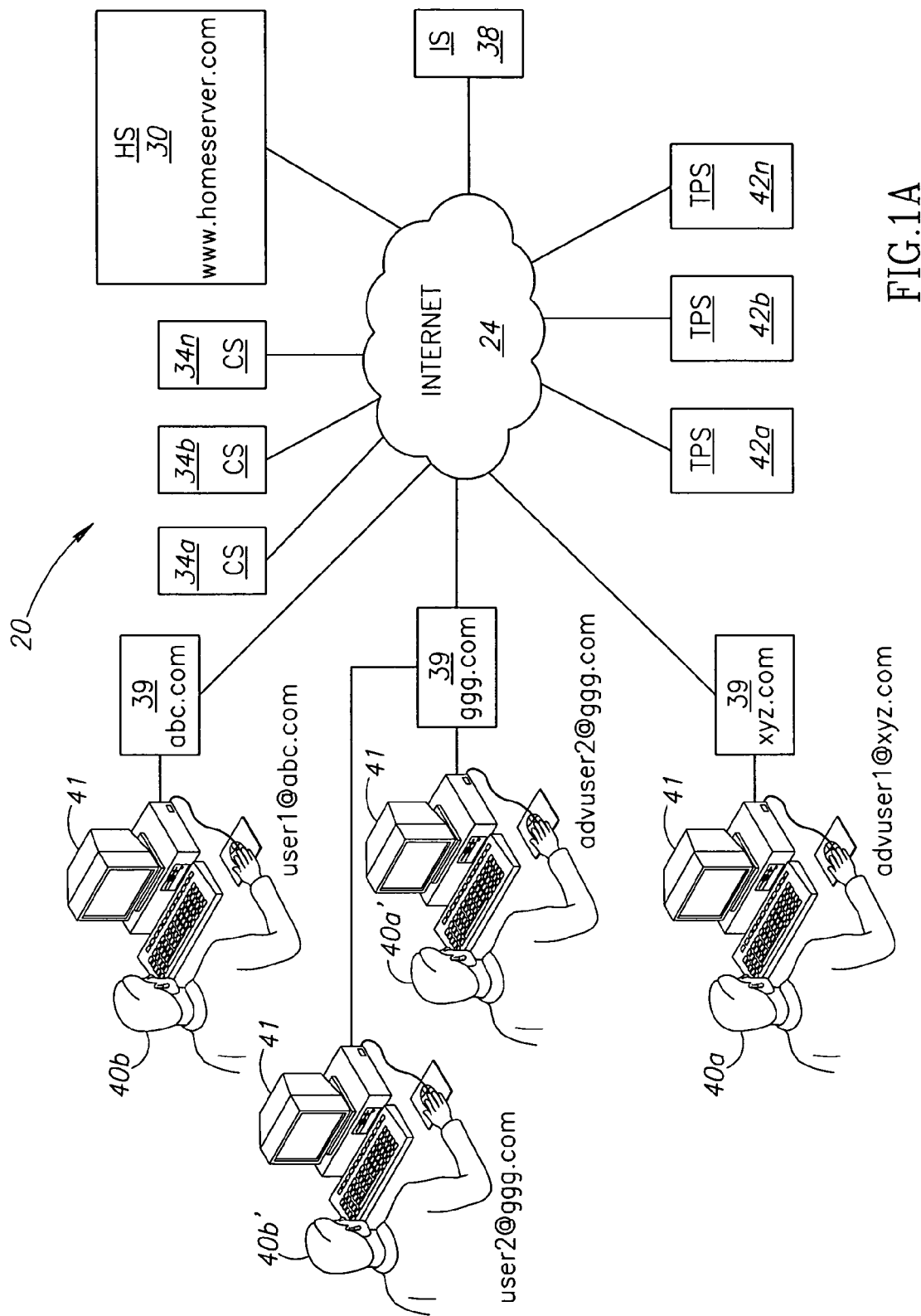
FIG. 1A is a diagram of a system that supports an embodiment of the invention.

FIG. 1A shows a system, which accommodates the present invention in an exemplary operation. The present invention employs a system 20, formed of various servers and server components, that are linked to a network, such as a wide area network (WAN), that may be, for example, the Internet 24.

There are, for example, numerous servers that are linked to the Internet 24, as part of the system 20. These servers typically include a Home Server (HS) 30, and one or more content servers (CS) 34a-34n. These content servers (CS) 34a-34n typically provide portions of data for the home server (HS) 30. Depending on the content to be provided to users (in particular, to their computers or other computer-type devices through their e-mail clients or web browsers or browsing software) there may also be imaging servers, such Imaging Server (IS) 38, as detailed in commonly owned U.S. Patent Application Publication No. 2005/0038861 A1, this document incorporated by reference in its entirety herein.

All of the aforementioned servers are linked to the Internet 24, so as to be in communication with each other. The servers 30, 34a-34n and 38 (depending on the content being sent to users), include multiple components for performing the requisite functions as detailed below, and the components may be based in hardware, software, or combinations thereof. The aforementioned servers may also have internal storage media and/or be associated with external storage media.

The servers 30, 34a-34n, 38 of the system 20 are linked (either directly or indirectly) to an endless number of other servers and the like, via the Internet 24. Other servers, exemplary for describing the operation of the system 20, include domain servers 39 for the domains associated with the users 40a, 40a', 40b, 40b' (for example, the domain "abc.com" for the user 40b whose e-mail address is user@abc.com), linked to the computers 41 (or other computer type device) of each user 40a, 40a', 40b, 40b'. While four users, advertising users 40a, 40a', and other users 40b, 40b', are shown, this is exemplary of the multitudes of users of the system.

Still other servers may include third party servers (TPS) 42a-42n, controlled by content providers, advertisers, and parties associated with advertisers, and the like. While various servers have been listed, this is exemplary only, as the present invention can be performed on an endless numbers of servers and associated components, that are in some way linked to a network, such as the Internet 24. Additionally, all of the aforementioned servers include components for accommodating various server functions, in hardware, software, or combinations thereof, and typically include storage media, either therein or associated therewith. Also in this document, the aforementioned servers, storage media, components can be linked to each other or to a network, such as the Internet 24, either directly or indirectly.

Figure 1B:
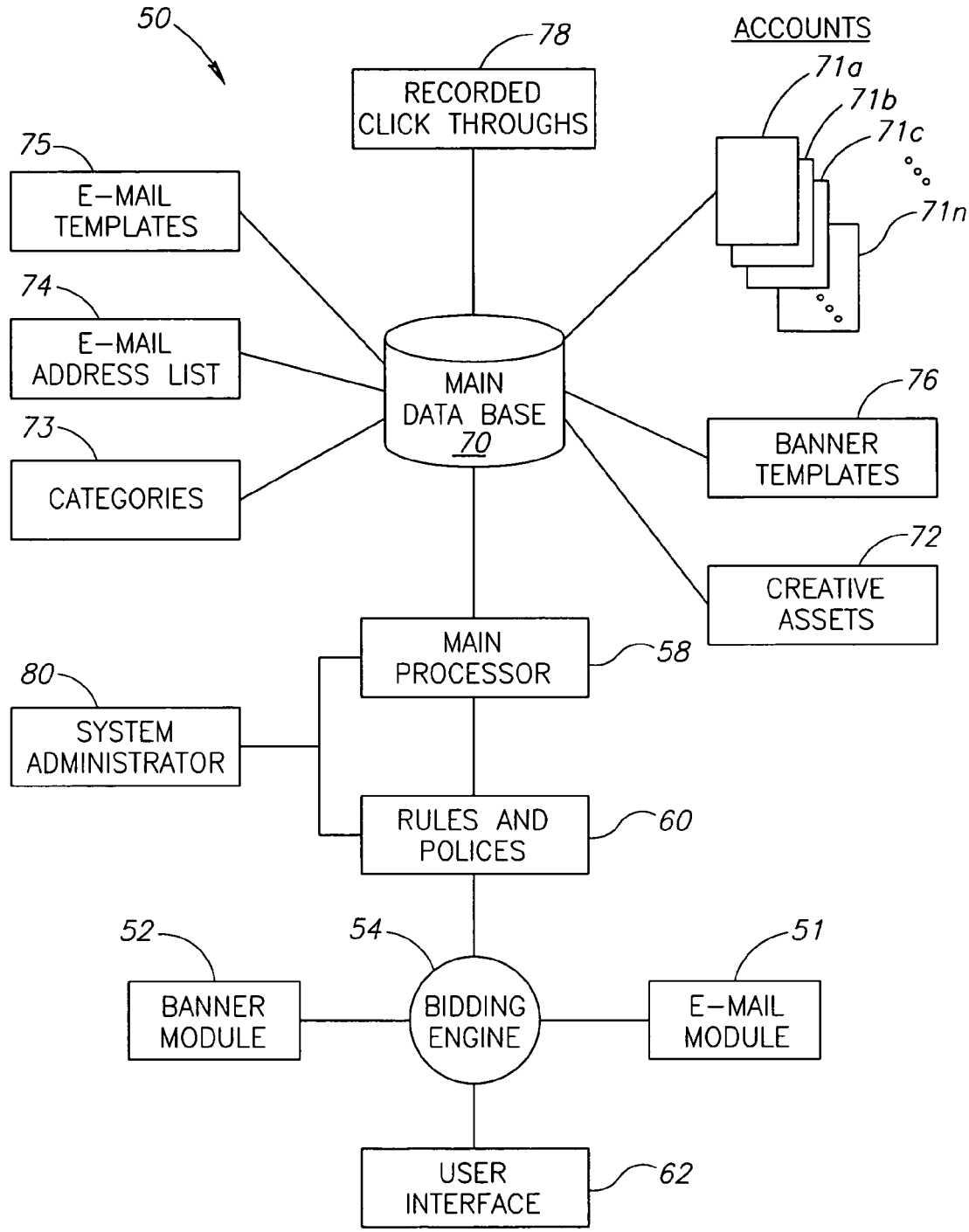
FIG. 1B is a diagram of an exemplary architecture for the home server of FIG. 1A.

The Home Server (HS) 30, as shown in FIG. 1B, is of an architecture that includes a system 50 of components for performing the methods and processes of the present invention. It also includes components and arrangements thereof, for supporting e-mail functionalities and banner functionalities, that overlay the displayed web pages, and other graphic functionalities. Also, for explanation purposes, the Home Server (HS) 30 may have a uniform resource locator (URL) of, for example, www.homeserver.com.

The e-mail functionalities, are typically performed by an e-mail module 51. These functionalities include handling (generating, sending receiving, collating, etc.) electronic mail, and performing other e-mail applications. The home server (HS) 30 also includes components for recording events, such as when e-mails are sent, whether or not there has been a response to an e-mail (a certain time after the e-mail has been sent), whether the e-mail has been opened, and whether the opened e-mail has been "clicked", such that the browser of the user is ultimately directed to target web site, corresponding to the link that was "clicked". When the user's browser reaches the target web site, this event is considered to be a "click through."

The e-mails, sent by the home server (HS) 30, are typically e-mails where text and graphics are preset for a template, and the URL placed therein is set to a specific targeted web site. These e-mails are assembled by conventional techniques and sent by conventional methods. The e-mails may also include attributes of the e-mails, as disclosed in commonly owned U.S. Patent Application Publication No. 2005/0038861 A1, that is incorporated by reference in its entirety herein.

The banner functionalities are performed by a banner module 52. These functionalities include handling (generating, sending receiving, collating, etc.) banners, and performing other associated applications. The home server (HS) 30 also includes components, for example, the sub-database 78 for recording events, such as whether or not there has been a click through in response to the banner having been sent.

The banners sent by the home server (HS) 30, may be banners in accordance with conventional banner producing software, hardware or combinations thereof used in servers and the like.

The home server (HS) 30 also performs accounting functions such as debiting accounts of advertising users upon valid click throughs (detailed below), as well as crediting accounts with funds when entered into the system 50. For example, funds may come into the system 50 from credit cards, bank transfers and the like. For example, accounts may be debited and/or credited manually, by the system administrator or the like, or automatically.

The architecture of the home server (HS) 30 also includes a system 50, for performing the methods and processes detailed herein. The home server (HS) 30 includes components for providing numerous additional server functions and operations. In particular, there is a bidding engine 54, whose operation is detailed below.

The home server (HS) 30, and the system 50, also include components, for example, comparison and matching functions, policy and/or rules processing, various search and other operational engines. The home server (HS) 30 (and the system) includes various processors 58, including microprocessors, for performing the aforementioned server functions and operations. There is also a rules and/or rules and policies processor 60 associated with the bidding engine 54 for determining the categories from which the sent e-mail or banner will correspond. A user interface 62, allowing users to interact with the system 50. This user interface 62 is typically coupled to the bidding engine 54. A graphical user interface (GUI) for both advertising users 40a, 40a' and other users 40b, 40b', through which data is received from and inputted into the system 50, may be associated with the user interface 62.

The home server (HS) 30 also includes a database or data store 70, with multiple sub-databases or sub-data stores. Exemplary sub-databases include information for each account 71a-71n, an in particular, files for account information (contact name, contact address, contact phone number, e-mail of responsible party, password, e-mail preferences, campaign name, acceptance of terms with name and initials of accepting party, the creative or creatives assigned to each selected category, the creative assets including text and URL associated with each creative asset assigned to each selected category, the selected category or categories, the channels selected, web and e-mail, an amount to be paid for a click through over the web channel, an amount to be paid for a click through over the e-mail channel, a daily campaign budget, and a campaign budget), as shown in FIG. 1C. Other sub-databases, for example, include those for creative assets 72 (unfilled or modifiable creatives-creatives with spaces for receiving the text, including the URL for a targeted web site, that is entered by the advertising user), categories 73, e-mail address list 74, e-mail templates 75, banner templates 76, and, recorded click throughs 78.

The system 50 is also such that the main processor 58 and rules and policies 60 can be programmed from a module 80. This module 80 may be internal or external to the system 50, and electronically linked to the main processor 58 and the rules and policies 60. The module 80 is typically operated by a system administrator, or the like.

The home server (HS) 30 may also be associated with additional caches, databases, as well as numerous other additional storage media, both internal and external thereto. The home server (HS) 30 and components associated therewith are, for example, in accordance with the home server described in U.S. Patent Application Publication No. 2005/0038861 A1.

For example, the users 40a, 40a', 40b, 40b' typically have computers 41 (such as a multimedia personal computer with a Pentium® CPU, that employs a Windows® operating system), that uses a browsing application, such as Internet Explorer® from Microsoft Corp. of Redmond, Wash., Netscape® Navigator®, and the like, and an e-mail client, for example, America Online® (AOL®), Outlook®, Eudora®, or other web-based clients. In this document, the client is an application that runs on a computer, workstation or the like and relies on a server to perform some operations, such as sending and receiving e-mail. The computers 41, are linked to the Internet 24, or other similar public wide area network.

At least one imaging server (IS) 38 is linked to the Internet 24. The imaging server (IS) 38 functions to convert text (data in text format) from the Homer server (HS) 30 (and in some cases, the content servers (CS) 34a-34n, as received through the Home Server (HS) 30), to an image (data in an image format). After conversion into an image, the image is typically sent back to the Home Server (HS) 30, to be placed into an e-mail opened by, for example, users 40b, 40b', or banner(s), as detailed below. Alternately, the imaging server (IS) 38 may send the image directly to the e-mail client or web page associated with the user 40, over the Internet 24.

Figure 2A:
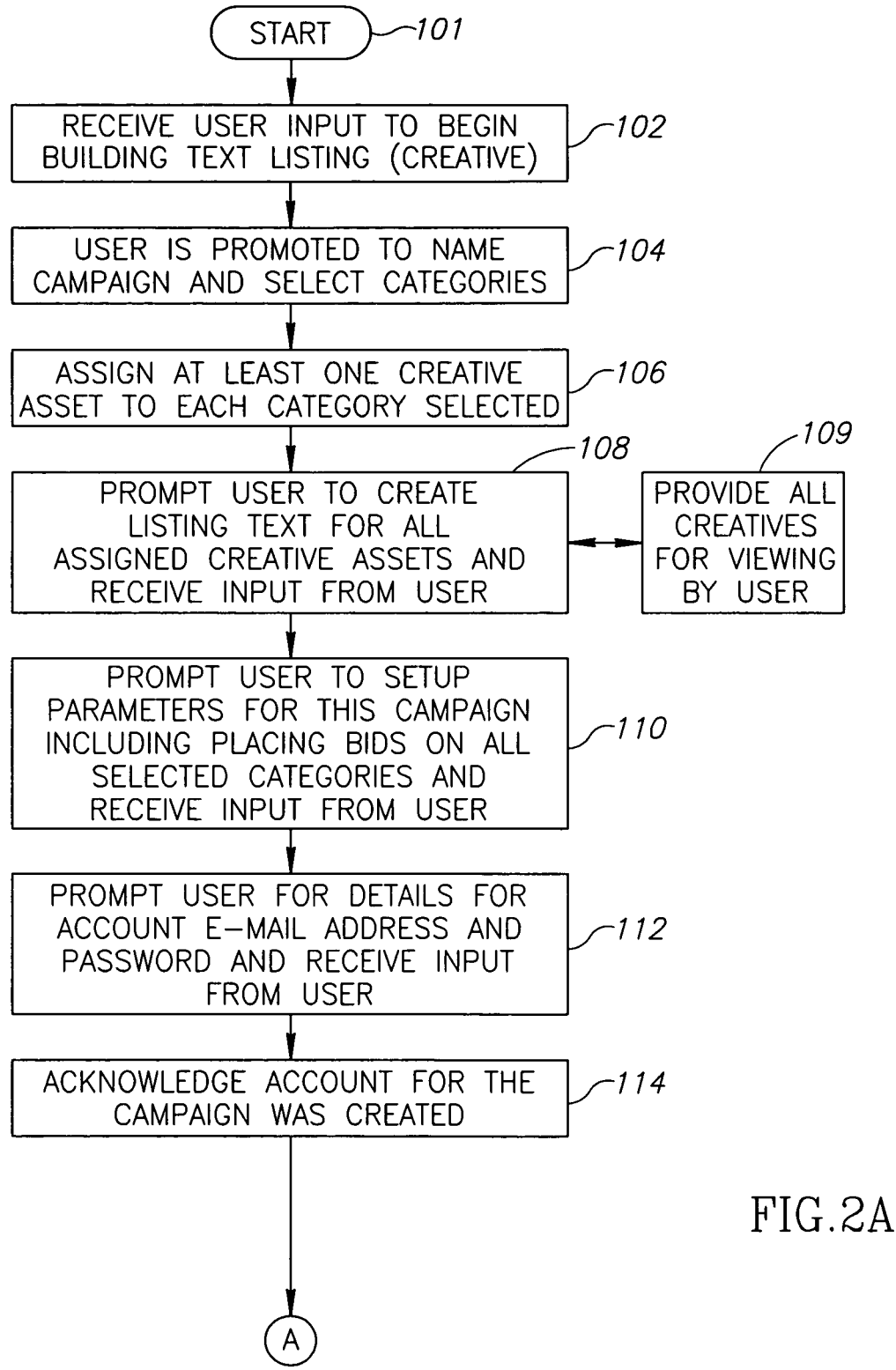
FIGS. 2A and 2B are a flow diagram of a method (process) performed in accordance with an embodiment of the invention.
Figure 2B:
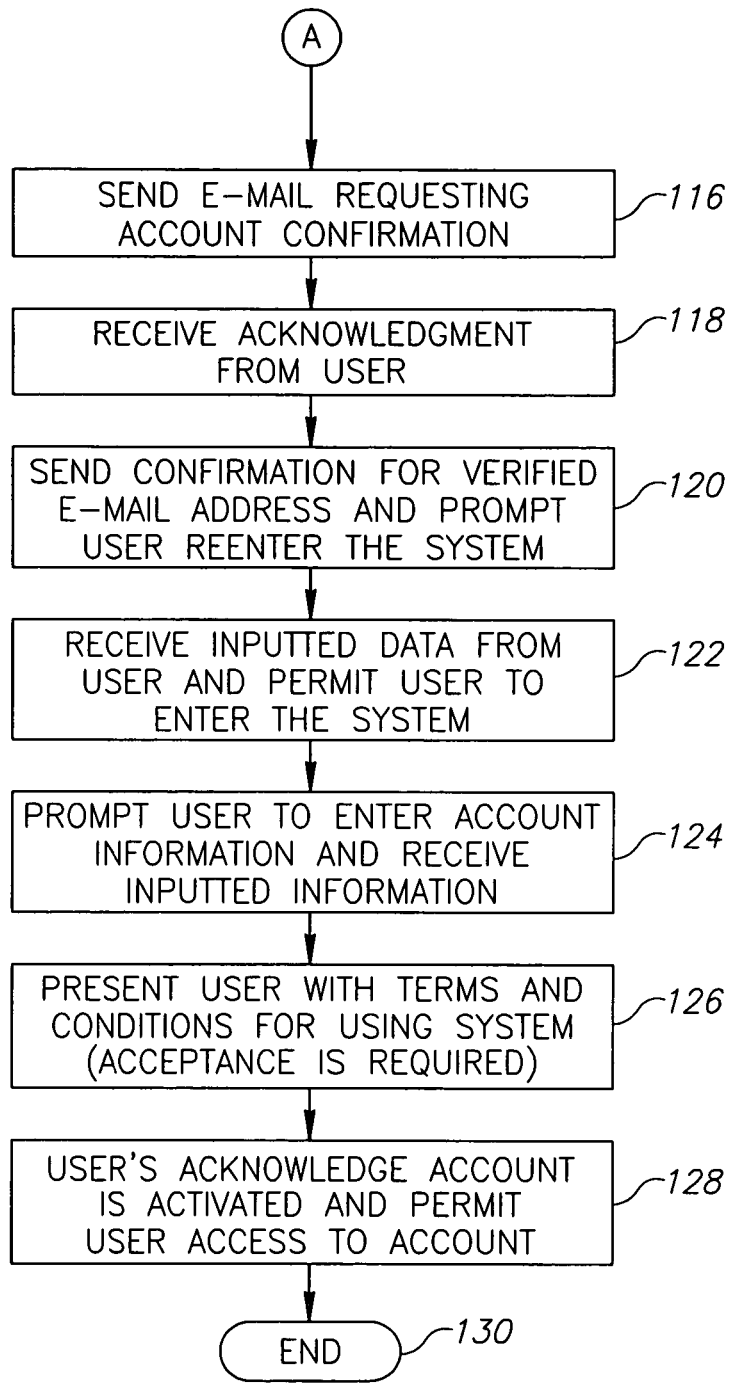

FIGS. 2A and 2B show a flow diagram of a method or process in accordance with an embodiment of the invention. These figures will be explained with reference to the diagrams of FIGS. 1A-1C, as well as the screen displays of FIGS. 3-16.

The process starts at block 101. Initially, an advertising user, for example, users 40a (advuser1@(xyz.com), 40a' (advuser2@ggg.com), accesses the home server (HS) 30, for example, by directing their browser to the home server (HS) 30, for example, by entering the Uniform Resource Locator (URL), www.homeserver.com. The advertising user receives a screen display from the home server (HS) 30, for example, the home page for the URL www.homeserver.com. The advertising user navigates this home page, and clicks on a link in a screen display, that will direct their browser to a web page, for example, the web page of the system 50, shown by the screen display of FIG. 3. This screen display accepts input from the advertising user and their account information.

Figure 17:
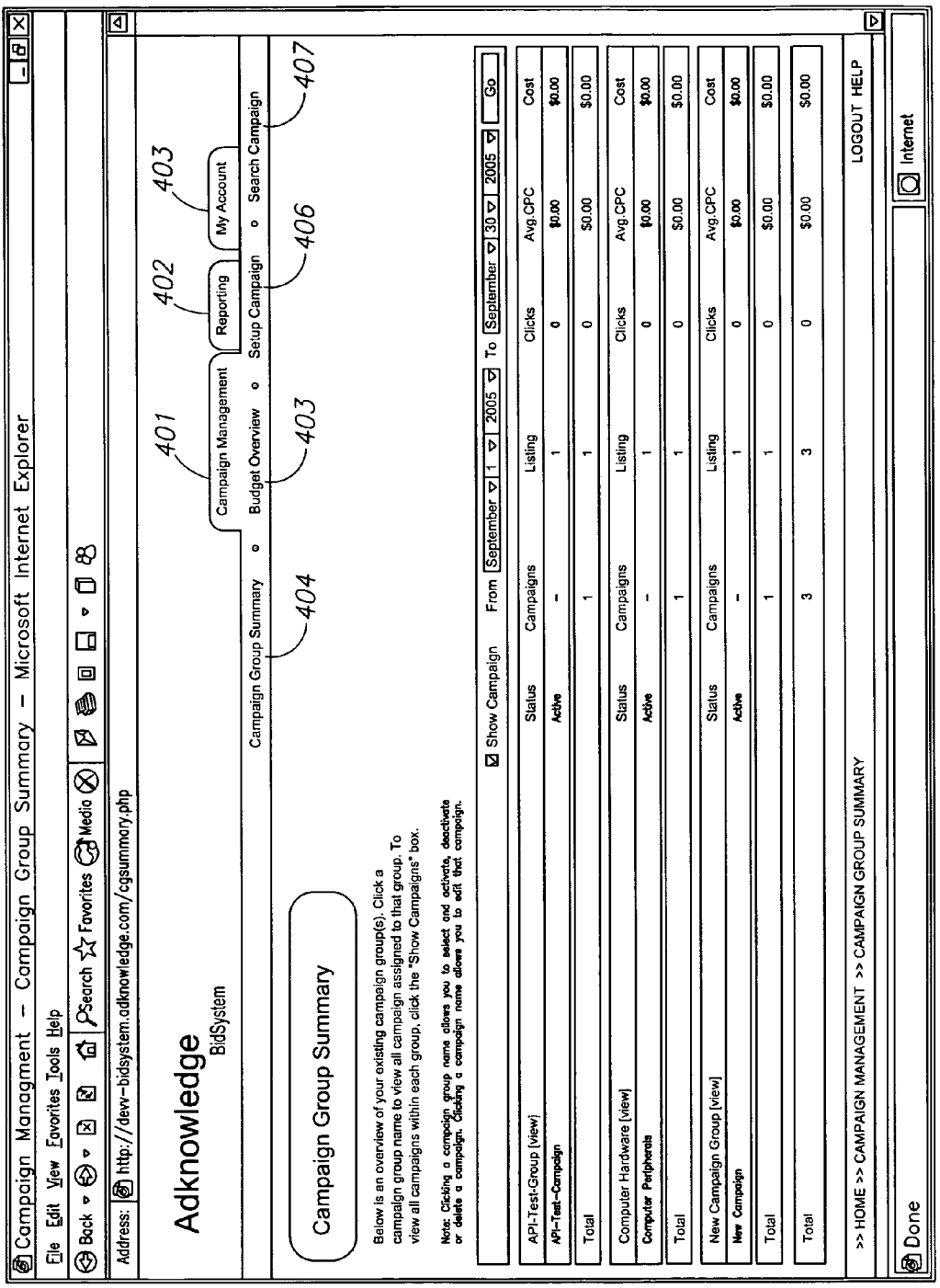
FIG. 17 is a screen display of a diagram that allows a user to manage their account.
Figure 18:
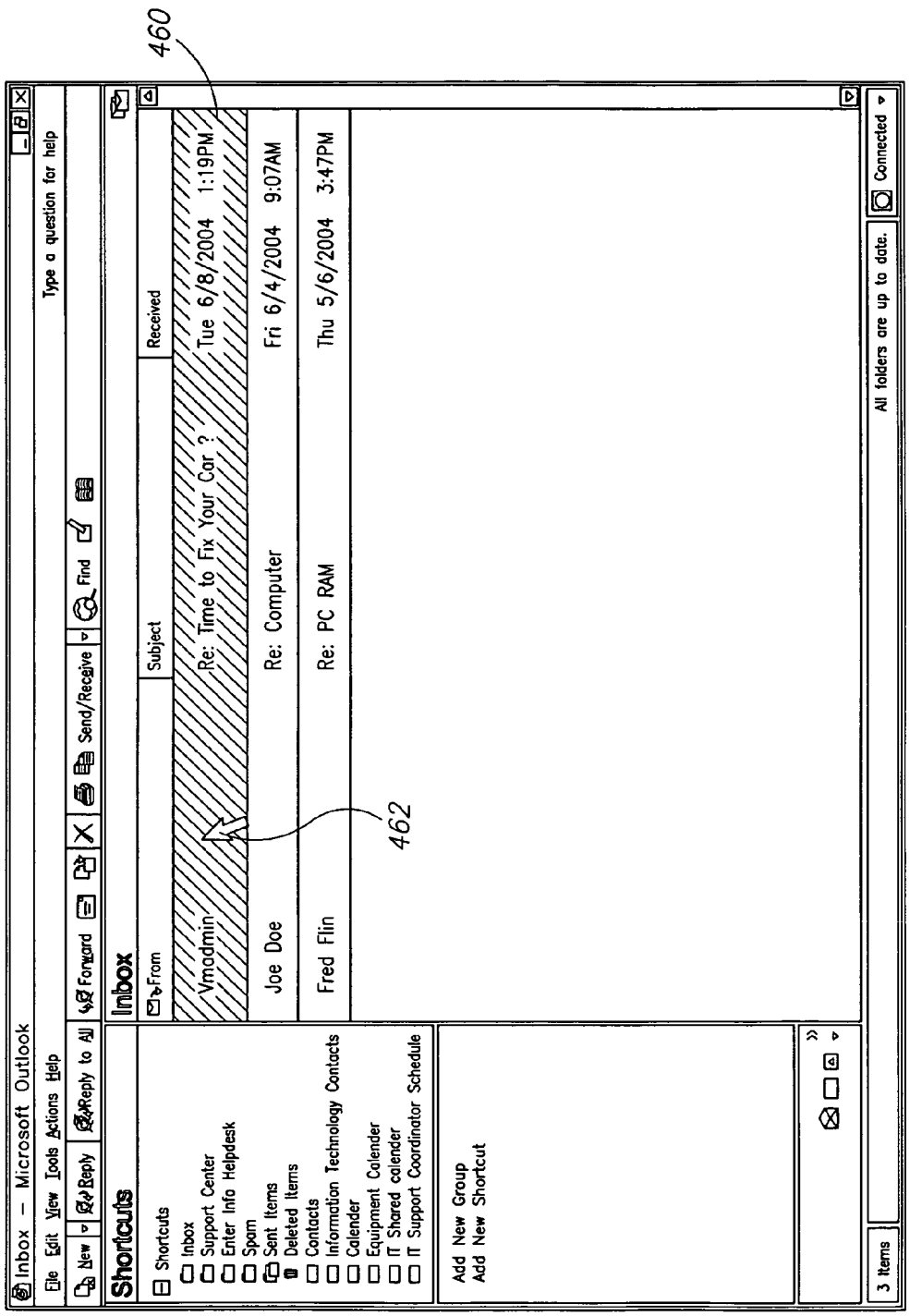
FIG. 18 is a screen display of the mail box of a user of the system.
Figure 19:
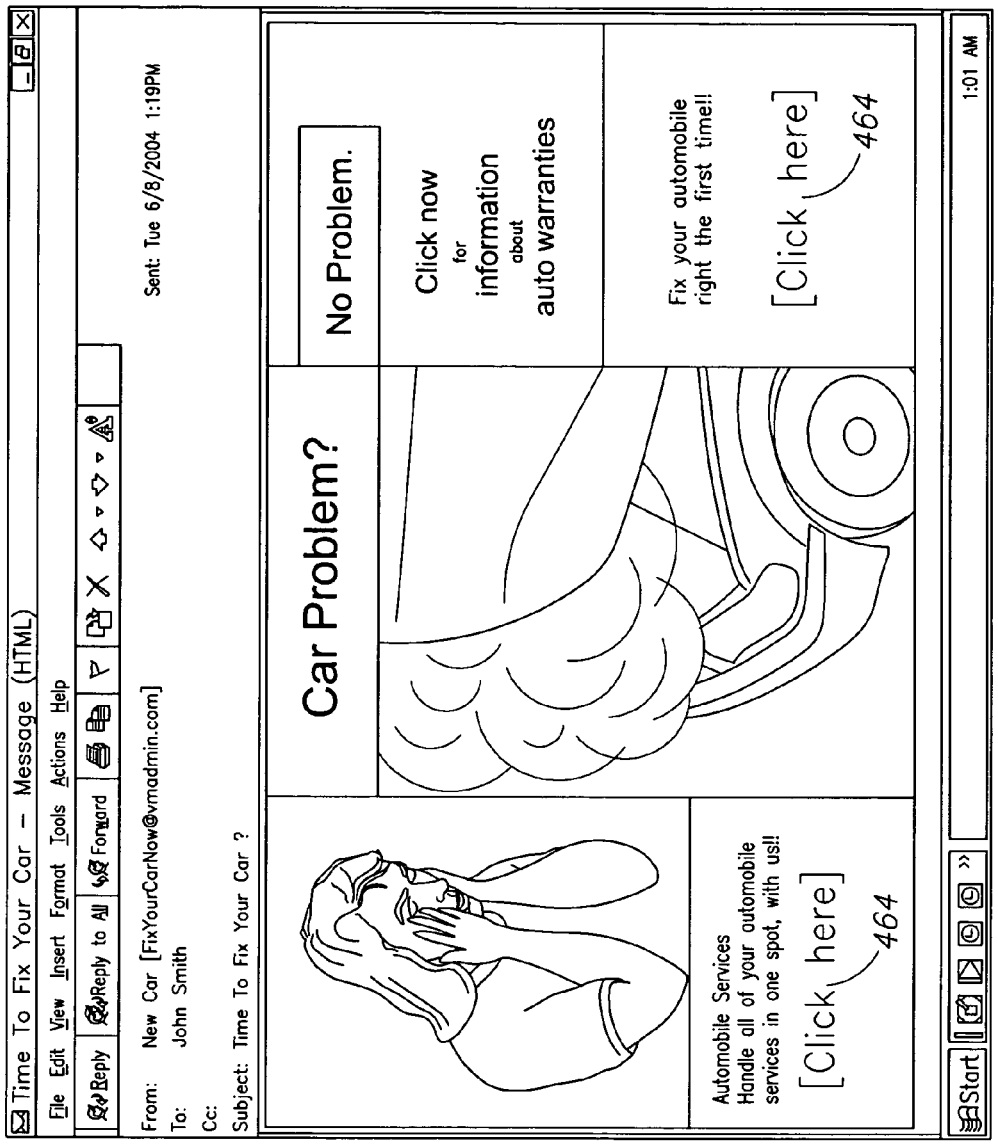
FIG. 19 is a sample creative sent to the user in response to the user opening the e-mail of FIG. 18.

At block 102, input from the advertising user is received in the home server (HS) 30. This user input may include a request to begin to build the advertiser's campaign and the creative(s) to be associated therewith. Input from the advertising user may also be received to access their account in the system. In this case, the advertising user will receive a screen display, such as that of FIG. 17, that allows the user to manage their account. Account management and FIG. 17 are discussed in detail below.

Figure 3:
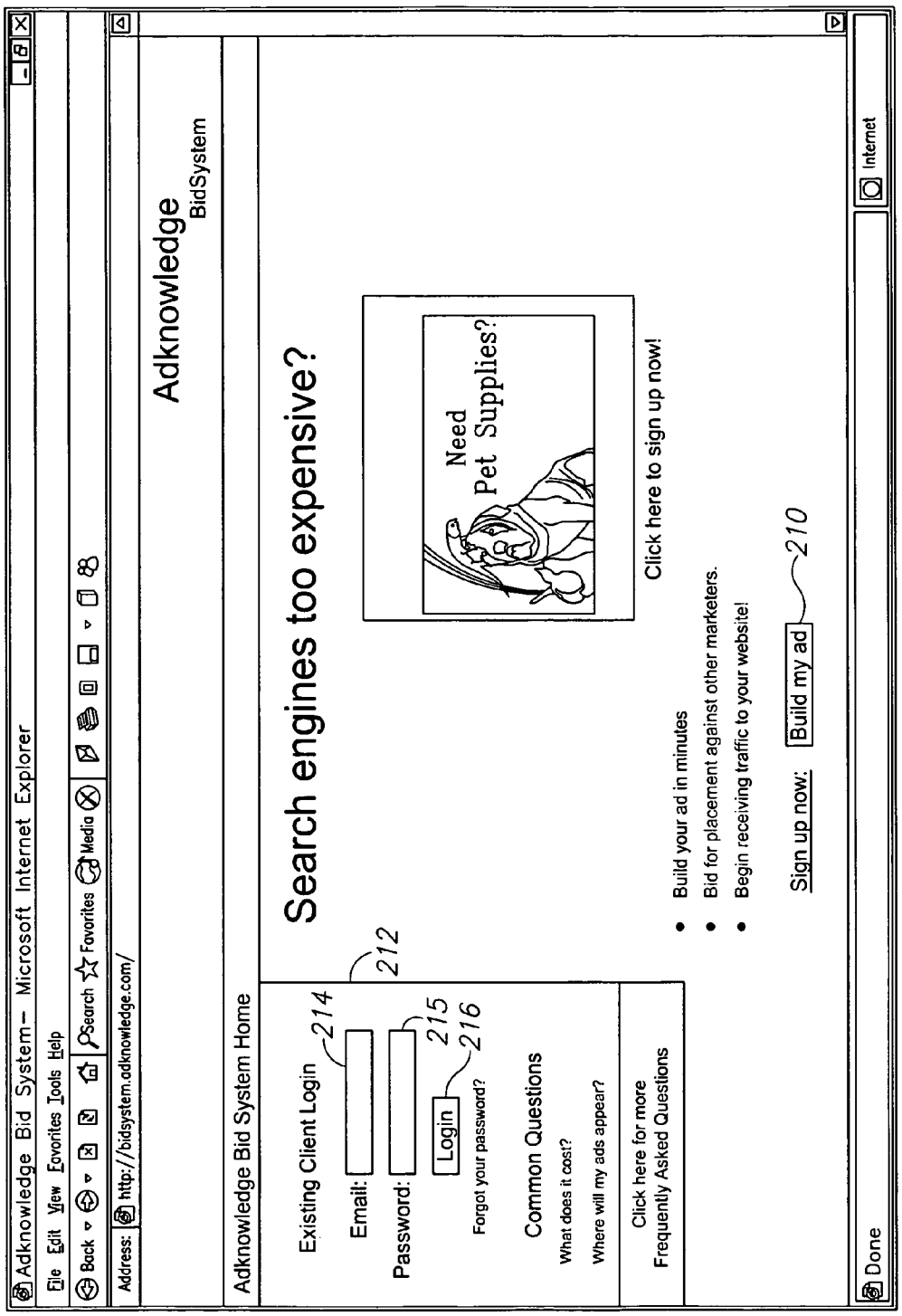

Turning back to the screen display of FIG. 3, for example, there is a button 210, for being clicked on by the advertising user, to build their listing for their creative(s). This button 210, once clicked, will move the process of building the creative (listing) forward.

Additionally, at box 212, there is a section where an advertising user, who has an account with the system, can access their account. Input as to the advertising user's e-mail, box 214, and Password, box 215, may be entered, and coupled with the user clicking on a "login box" 216, will allow the advertising user to access their account and manage it.

The process moves forward to block 104, where the advertising user is prompted to name their desired campaign and select their desired categories. The listed categories are preprogrammed into the system, and include primary categories, that can be modified with secondary, tertiary, and quaternary categories, these additional categories programmed into the system 50, based on the selection of the previous category. Specifically, advertising users select their primary category, and are then prompted to select a secondary category, based on the primary category. The advertising user than selects a tertiary category, based on the secondary category, and finally, they select a quaternary category, based on the tertiary category. Each category (primary, secondary, tertiary and quaternary) may be a word or group of words. While a primary through quaternary category (of a word or groups of words for each) is described to make a category, this is exemplary only, as a category may be one word or word groups, two words or word groups, or as many separate words or groups of words as desired.

Figure 4:
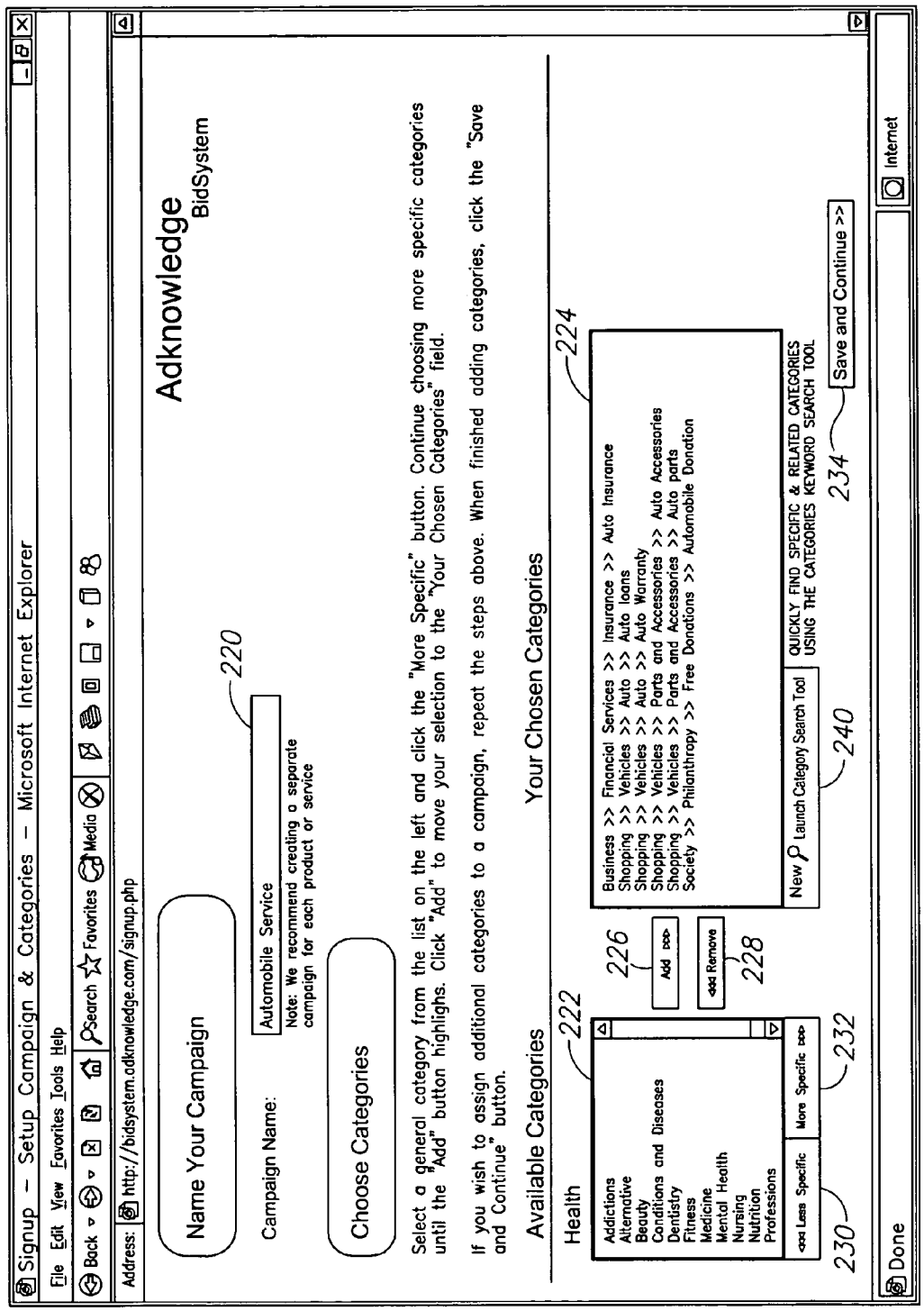
Figure 5:
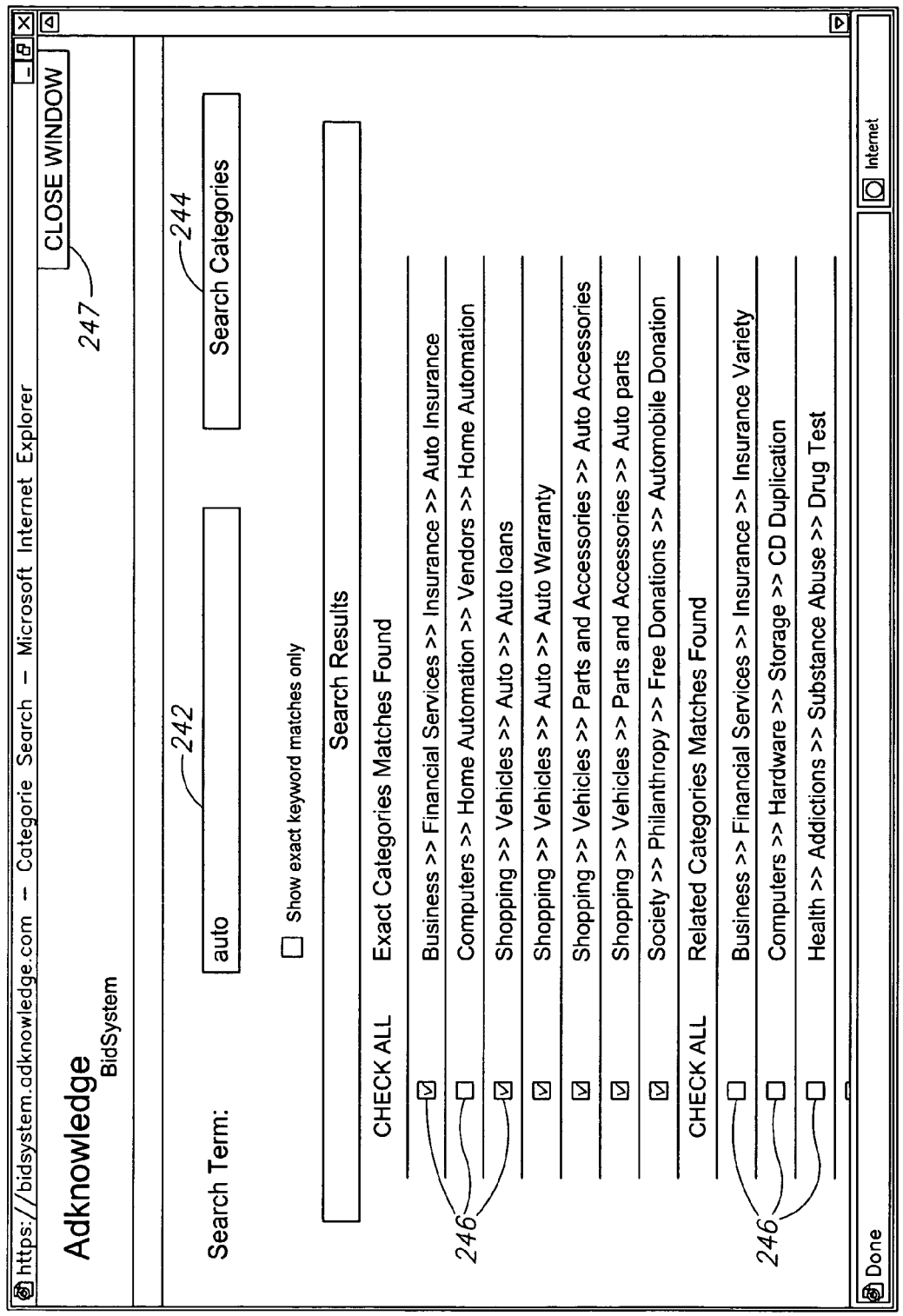

The screen displays of FIGS. 4 and 5 appear when the user is prompted to name their desired campaign and select their desired categories. In the screen display of FIG. 4, there is a section to "NAME YOUR CAMPAIGN", and a box 220, for receiving input from the advertising user, for the campaign name. There is also a section to "CHOOSE CATEGORIES", with a box 222 ("AVAILABLE CATEGORIES") listing available categories and preceding or subsequent categories, after a category has been selected. There is also a box 224 ("YOUR CHOSEN CATEGORIES") where the user selected categories, and the desired degree of specificity (one or more categories) are listed.

There are also boxes that cover links for adding categories (box 226) and removing categories (box 228). For maneuvering in the categories box 222, there are boxes that cover links for less specificity (box 230) or more specificity (box 232) of the categories. If the category selection is finished, the user may click on a box 234 where the categories are saved and the process continues.

Alternately, should additional categories be desired, they may be searched for by the user, by clicking on box 240, to launch a category search tool. Clicking on box 240 would activate the screen display of FIG. 5. The user is prompted to enter a search term, in a box 242. With the search term, for example, a word or group of words, entered (inputted) into the box 242, the user clicks on a box 244, and performs a search for all relevant categories. These categories typically include relevant subcategories, listed under the section "SEARCH RESULTS". Check boxes 246 are placed next to each category found in the search, with options for the user to check one or all categories found in the search and listed on the screen display. The categories of the checked boxes, are then transferred to the box 224 of chosen categories, in the screen display of FIG. 4. This is typically done by the advertising user closing the window of this screen display, by clicking on the box 247 "CLOSE WINDOW", in the screen display of FIG. 5. Once all categories have been selected, the advertising user may click on the box 234, where the categories are saved and the process continues.

With the categories selected, the process moves to block 106, where the system 50 assigns one or more creative assets (stored for example in the sub database 72) to each selected category. A creative asset is the image prior to the insertion of text at various locations as well as a URL for the underlying link (covered over by a clickable box, that when clicked activates the underlying link to direct the user's browser to the targeted web site in accordance with the inputted URL). Once the text and the link have been added to the creative asset, it becomes a creative, also referred hereto as an advertising communication. The creative assets and their resultant creatives are suitable for placement into both e-mails and banners. The actual operation of the creatives in e-mails and banners is detailed below, with reference to FIGS. 18-23.

The advertising user is then prompted to create their listing text (or listing) and provide their URL. This data (corresponding to the listing text, including the URL of the targeted web site) is placed (imported) into all of the assigned creative assets for the categories selected for their campaign, to create their creatives or advertising communications, at block 108.

Figure 6:
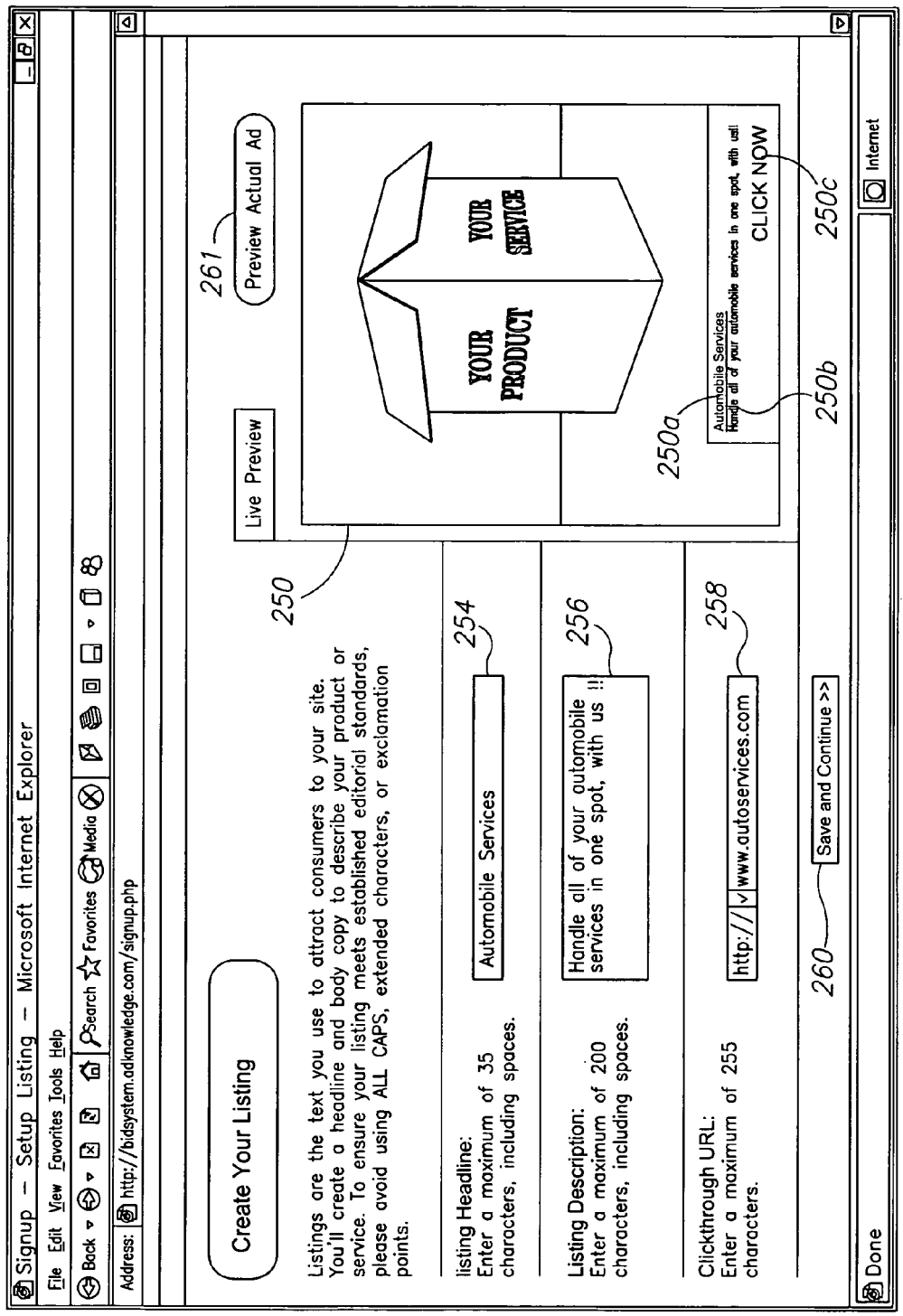

For example, creation of the listing will result in the screen display of FIG. 6, appearing on the monitor of the user. Creation of the listing involves the user seeing a graphic 250, with sample locations for headlines 250a, a listing description 250b, and a link 250c. The listing is created, as the user enters data, including: 1) a desired headline, into block 254, 2) a desired listing description, into block 256, and, 3) a click through URL, into block 258. The advertising user can save this entered data by clicking on box 260, and the process moves to block 110.

Alternately, the complete creatives, as assigned to the categories, may be accessed, by the user clicking on box 261. If this box (261) is activated, the process moves to block 109, where the system provides all of the creatives for the selected categories, for viewing by the user. For example, as shown in the screen display of FIG. 7, the advertising user may view the creatives for the categories selected.

Figure 7:
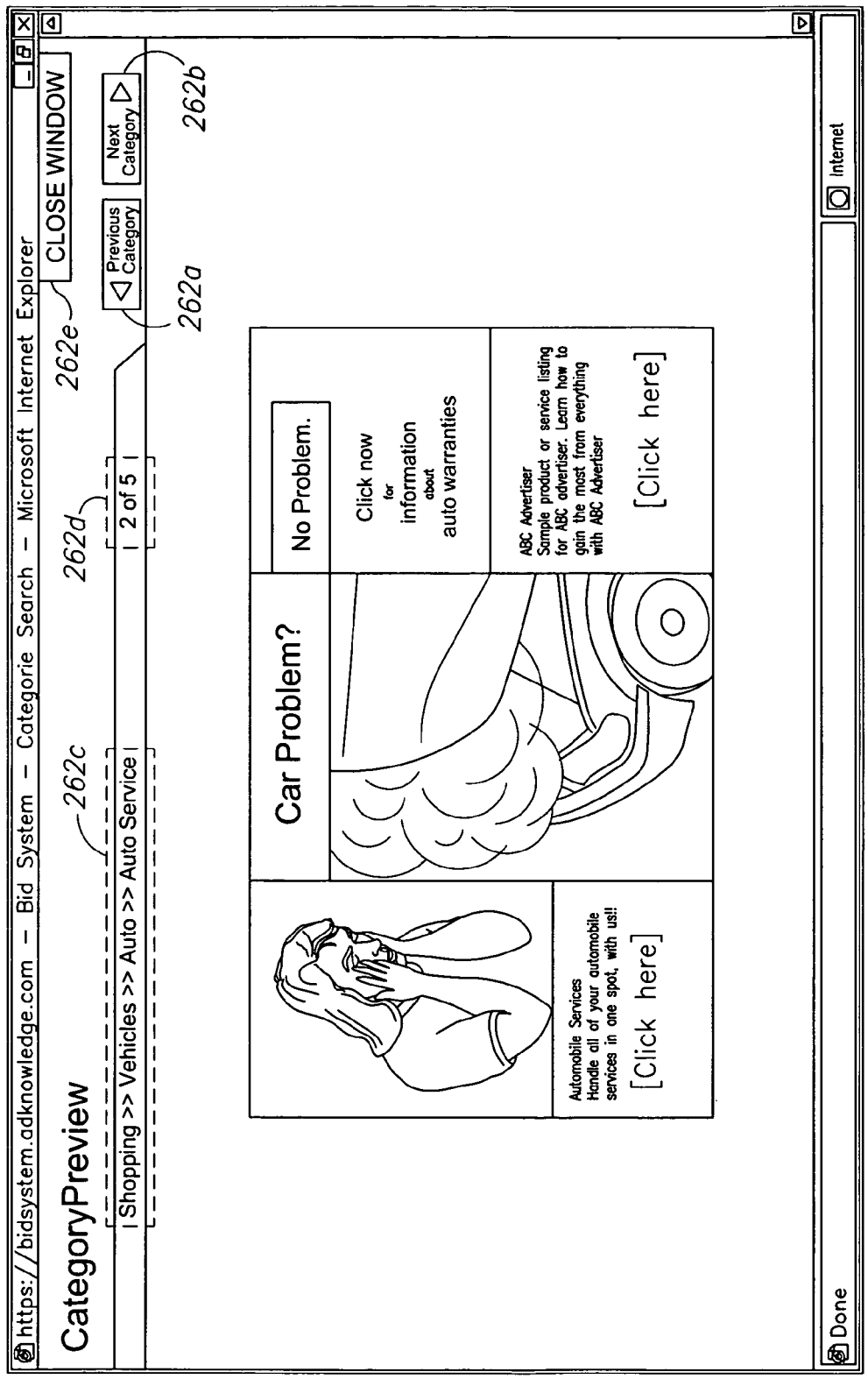
Figure 9:
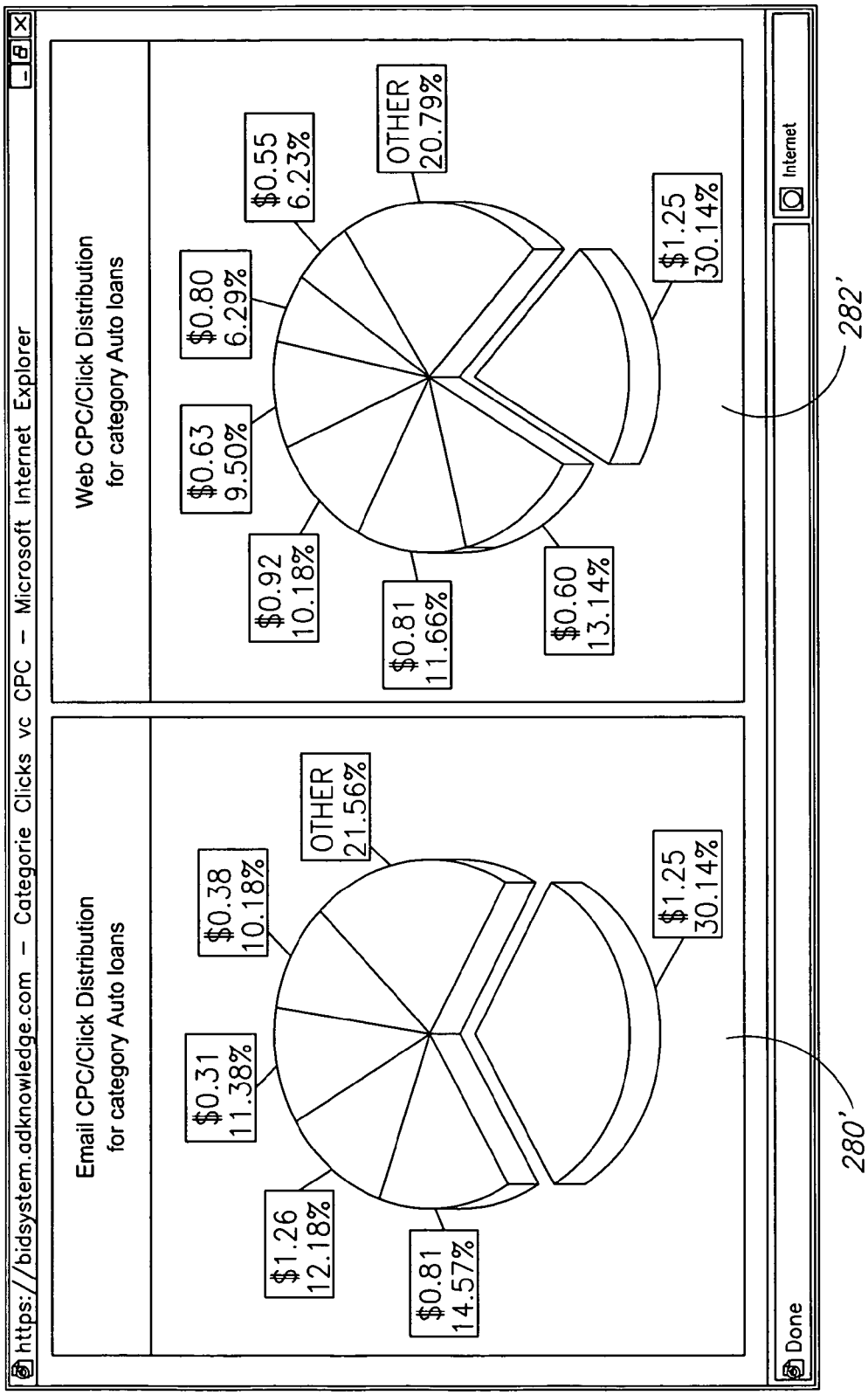
Figure 10:
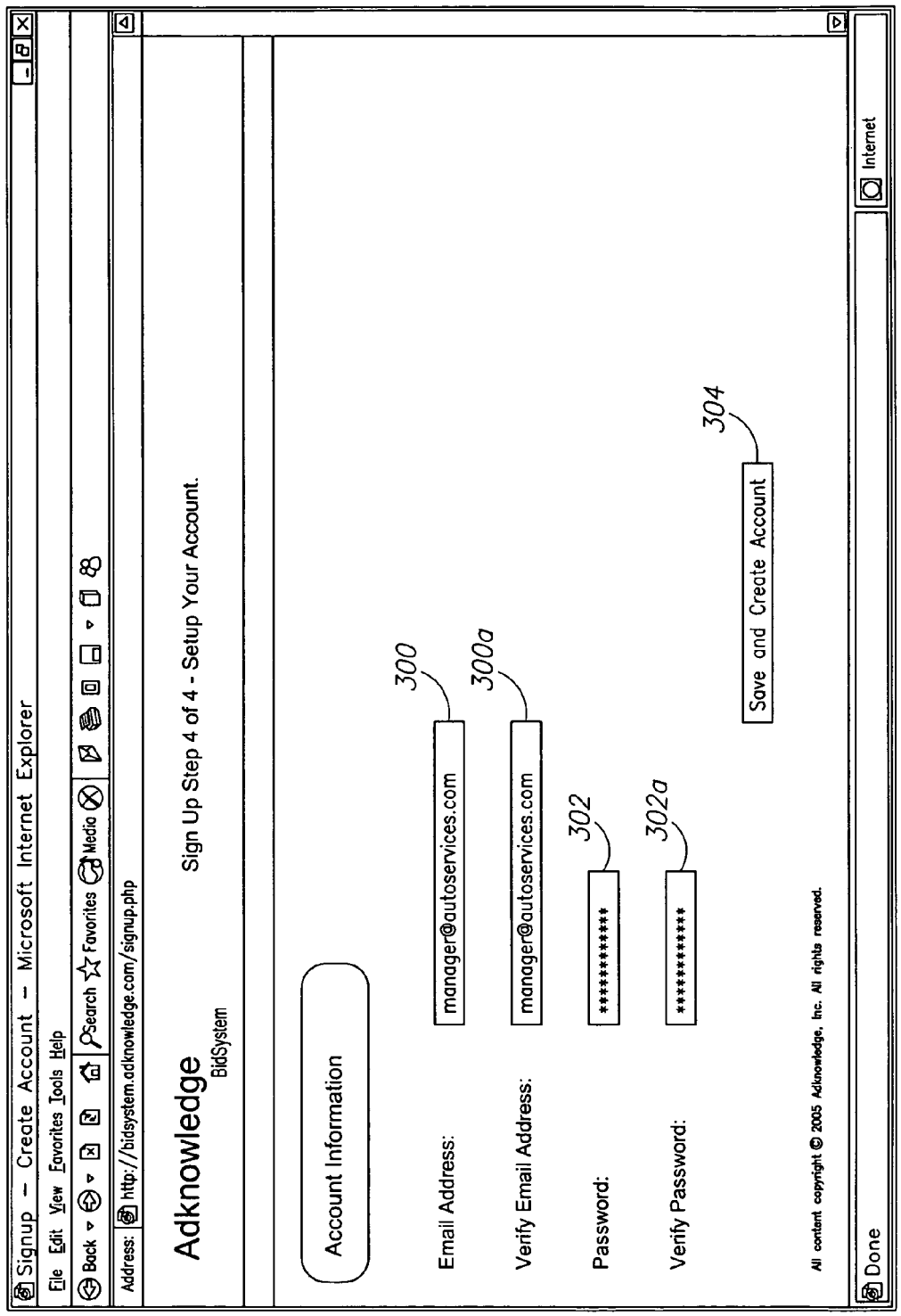
Figure 11:
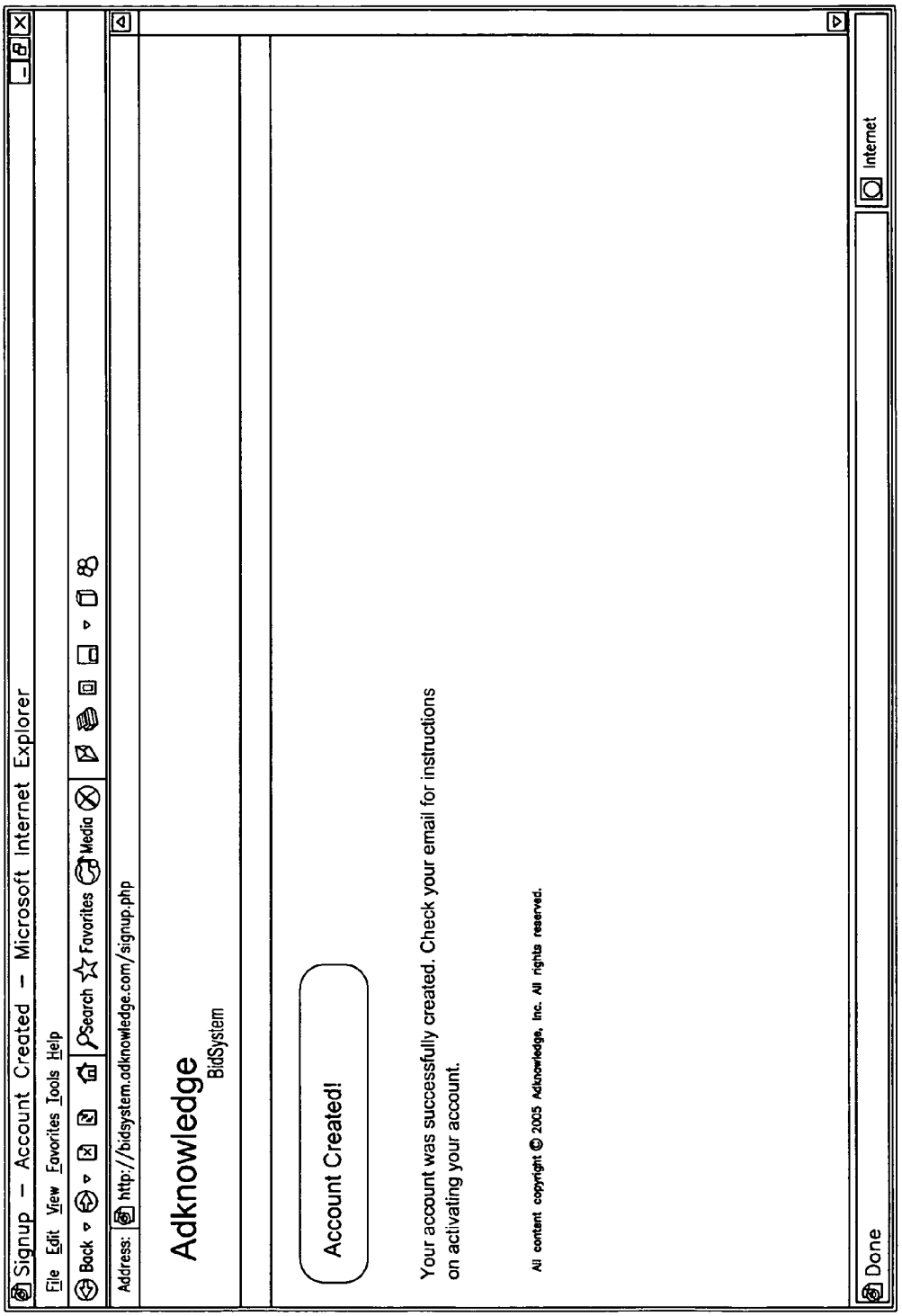

In FIG. 7, the creatives for each category may be viewed by clicking on buttons 262a and 262b. Here, for example, the creative for the category "Shopping>>Vehicles>>Auto>>Auto Service" (in the broken line box 262c) is displayed. The creative is the second creative of five, for the selected categories corresponding to the campaign (as seen in the broken line box 262d). Once the advertising user wants to move the process forward, they close this window, clicking on box 262e, and the process returns to block 108, and the screen display of FIG. 6.

Once in the screen display of FIG. 6, the user clicks box 260, and the process moves forward to block 110.

In block 110, the advertising user is prompted to select campaign parameters. In particular, the advertiser user enters maximum amounts (these amounts also referred to as bids) that they will pay for each click (also known as pay per click or PPC) on a link (embedded in the advertiser's creative) that will direct a user's browser to their targeted web site. These amounts are entered into the bidding engine 54. The bidding engine administers distribution of the creatives, including ordering and ranking of creatives (associated with one or more categories, typically selected or designated by the system 50 in accordance with rules and/or policies 60, as detailed below), over both the e-mail and web channels, based on the amounts or bids entered and, in some cases when desired, other parameters associated therewith.

All advertising users enter amounts for which they will pay for a user's click on a link, that will direct the user's browser to their targeted web site. The amounts entered by the advertising users are bids for their creatives, with embedded links to URLs of their targeted web sites, to be sent to various users (in order that the user click on the listing, such that the underlying (embedded) link will cause the user's browser to be directed to the advertising user's target web site). The amounts or bids are modifiable, as typically administered through the account management system, as shown in FIG. 17 and detailed below.

The bidding may be for listings delivered over one or more channels. These channels may include, e-mail channels, and web channels. The e-mail channel(s) are those commonly associated with electronic mail and similar communications. For example, some e-mail channels are disclosed in commonly owned U.S. Patent application Publication No. 2005/0038861 A1, which is incorporated by reference in its entirety herein.

Web channels may be, for example, those that originate with banners (as defined above). These web channels are typically those channels over which banners are sent to web sites and web pages.

For example, the screen display of FIG. 8 shows an example of the various parameters employed in setting the account. Initially, the advertising user inputs the amounts they will pay for each click through to their targeted web site, over the e-mail channel, box 280, and over the web channel, box 282. The advertising user also inputs a daily budget, typically in a monetary amount, such as U.S. Dollars, in box 284, and a campaign budget cap, in box 286.

Box 290 (shown in broken lines) provides information on the campaign, on both the e-mail and web channels. Here, the advertising user may see the various categories (including subcategories) to which users are responding to by clicking on the button corresponding to the underlying link, and the costs associated with each click. Within the box 290 are also boxes, controlled by the advertising user, for removing the category 291, or modifying category choices 292. An additional box 293 allows for the estimates of box 286 to be recalculated, when clicked on by the advertising user. The system is such that these estimates of box 286 can be represented graphically, for example, in a pie chart, as shown by the screen display of FIG. 9 for the e-mail channel, box 280' and web channel, box 282'.

With the campaign parameters established, the process moves to block 112, where the advertising user is prompted to enter the details of their account, for the campaign that was created, and input data for these details the in system 50. For example, these functions are performed on the screen display of FIG. 10, where the advertising user is prompted to enter his e-mail and chose a password for this campaign, in boxes 300 and 302, and verify this inputted data, in boxes 300a and 302a. There is also a box 304, that if clicked on by the user, will cause the system 50 to save the account and create the account, corresponding to the entered e-mail address and password.

At block 114, the now-created account for the advertising user's campaign is acknowledged. This acknowledgement is shown by the screen display of FIG. 11, received on the advertising user's computer 41.

Figure 12A:
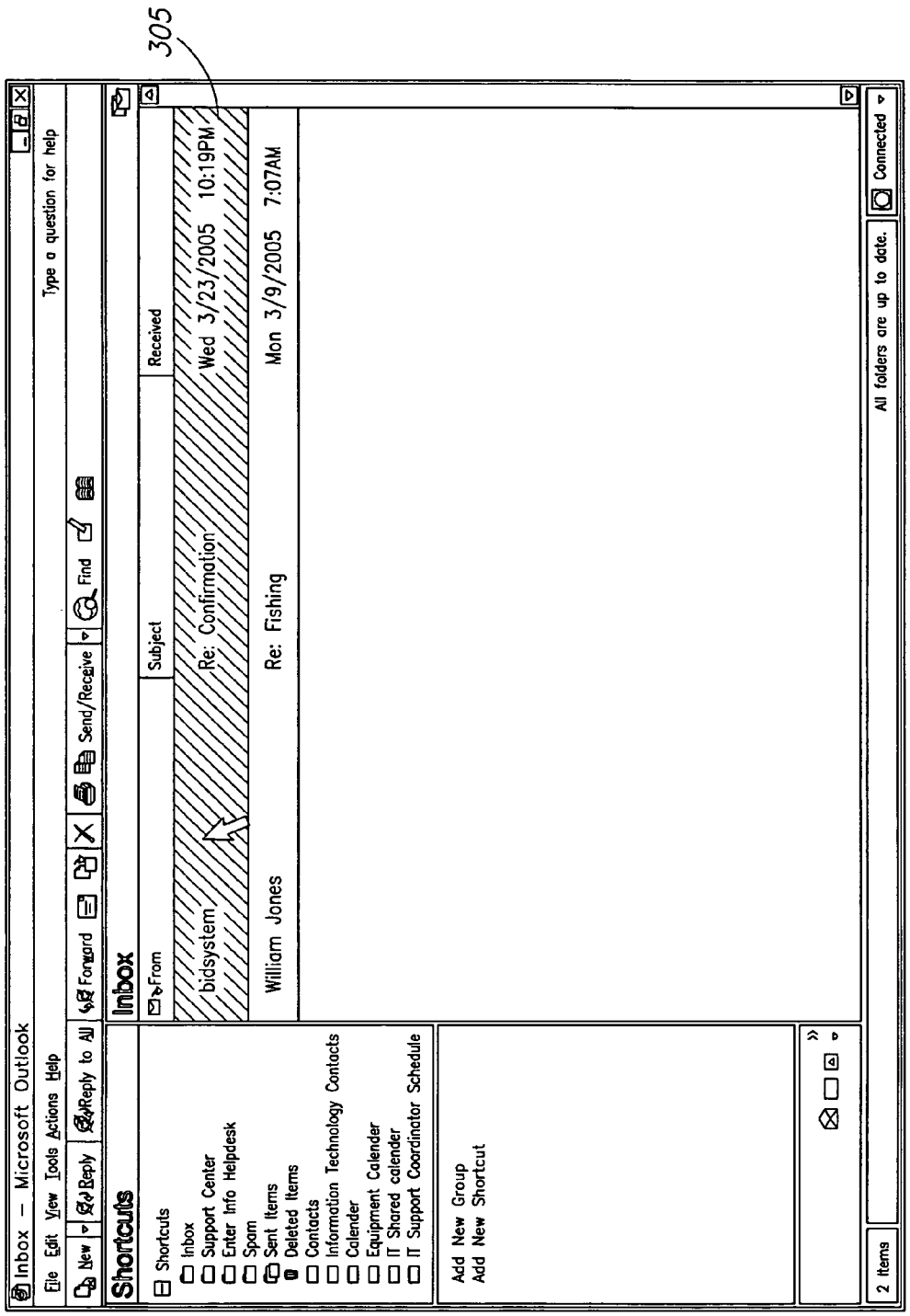
Figure 12B:
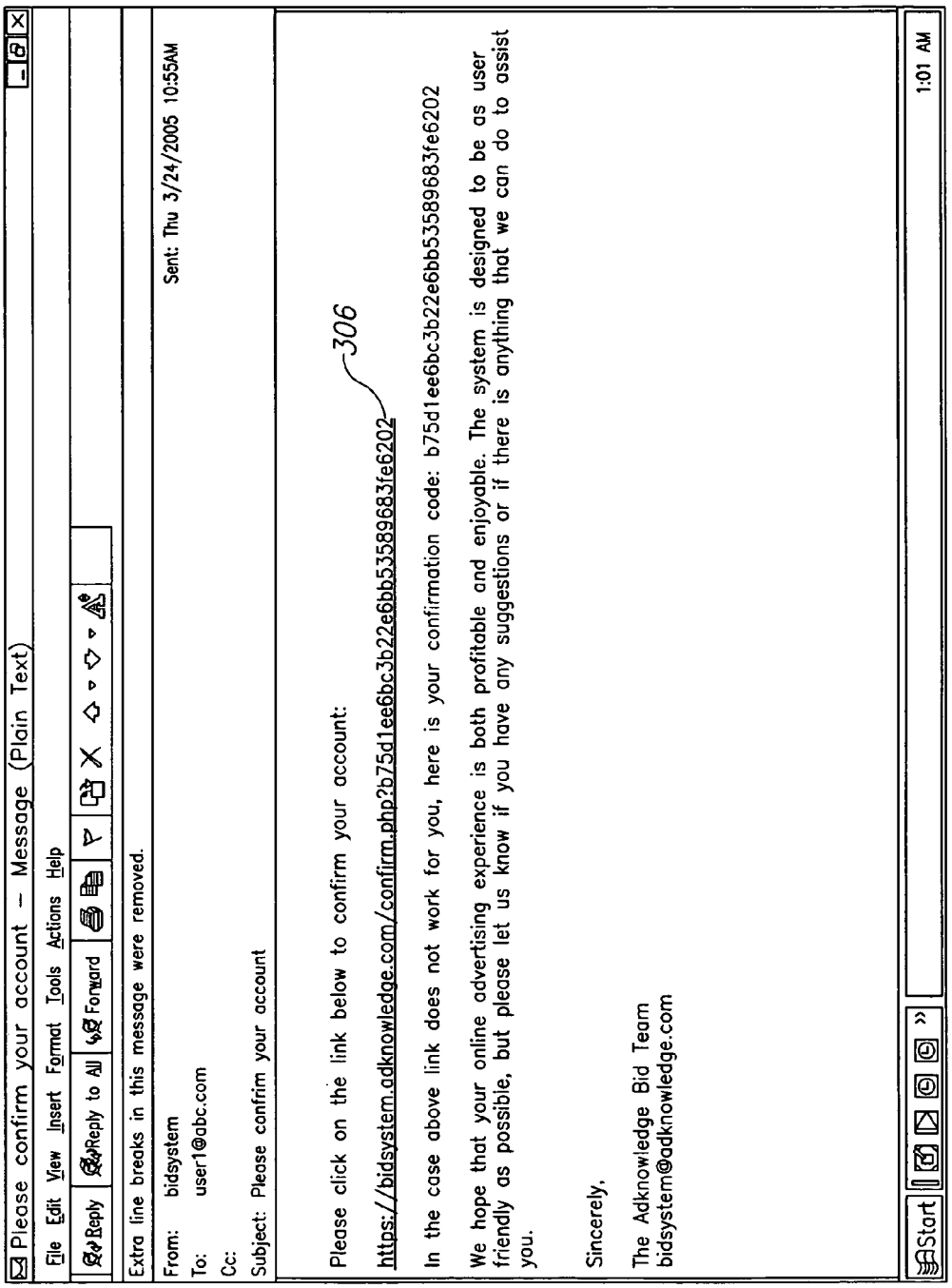
Figure 13:
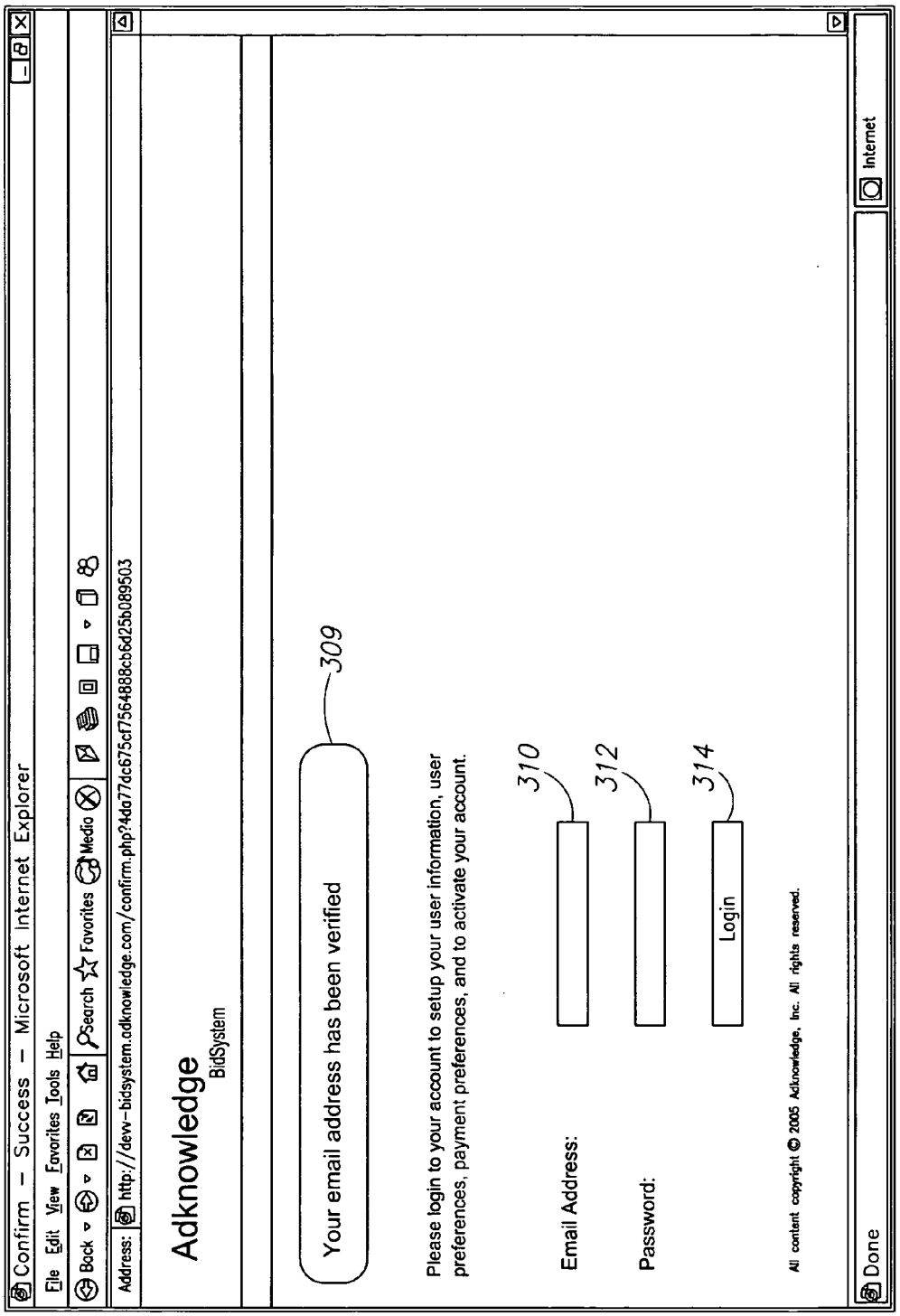
Figure 14:
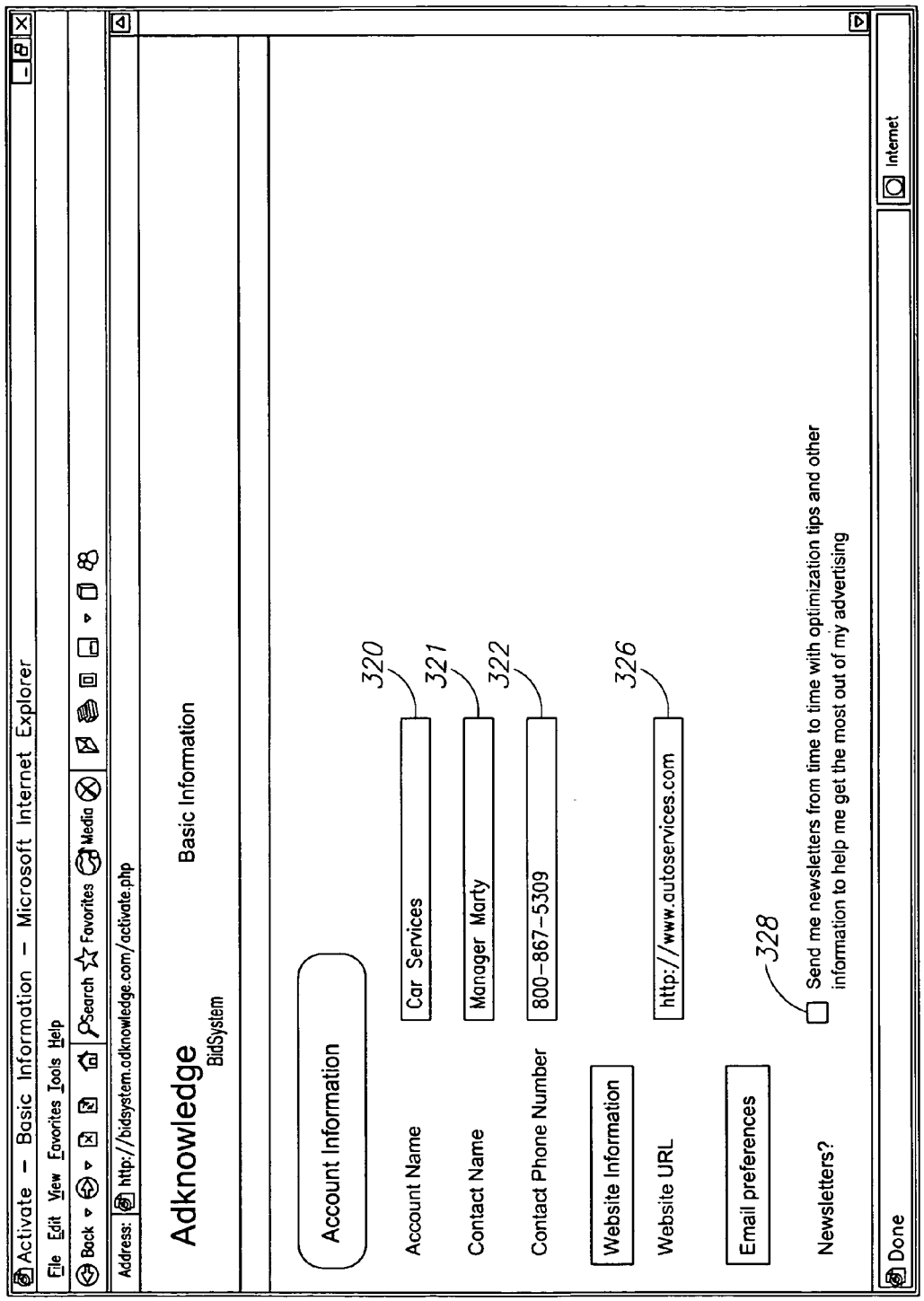

The system then sends an e-mail, or other communication, postal or the like, to the advertising user, at block 116. This e-mail requests account confirmation by the advertising user, and until such confirmation is received, the system 50 suspends the account. For example, as shown in FIG. 12A, the e-mail is received in the in-box of the advertising user, as a text line 305. The advertising user opens the e-mail, by clicking on the text line 305, and the e-mail of the screen display of FIG. 12B appears on the advertising user's computer 41. This e-mail includes a link 306, that once clicked will be sent to the system 50 of the home server 30, is an acknowledgement from the advertising user that the e-mail has been received. The system 50 receives the acknowledgement, at block 118.

With the acknowledgement received, the system 50 also sends the advertising user a confirmation of their e-mail address and prompts the user to enter data for reentry into the system 50, at block 120. The system 50 sends the advertising user a screen display (of FIG. 13) indicating the advertising user's e-mail address has been verified (box 309), with the prompts therein satisfied, as the advertising user enters their e-mail address in box 310, and the password for this requisite campaign in box 312. The advertising user then clicks the login box 314, to input the e-mail address and password into the system 50. This inputted data is received, and if authorized, the advertising user is permitted entry (reentry) into the system 50, at block 122. The e-mail address and password are typically verified by comparison and verification software in the home server (HS) 30 or a server affiliated therewith.

The process moves to block 124, where the advertising user is prompted to enter (input) account information, and the data corresponding thereto, for receipt in the system 50. This inputted information may include account (campaign) information, web site information and e-mail preferences. For example, in the screen display of FIG. 14, as received by the advertising user, there are boxes for the account name 320, contact name 321 and contact phone number 322 of the entity that controls the campaign (account). There is also a box for a website URL 326 and a check box 328 for e-mail preferences.

With the account (campaign) information entered, the advertising user is presented with terms and conditions for using the system, at block 126. The advertising user is prompted to accept these terms and conditions, and input from the advertising user must be received by the system, typically at the home server (HS) 30, that the terms and conditions are accepted, prior to the advertising user's account being activated.

Figure 15:
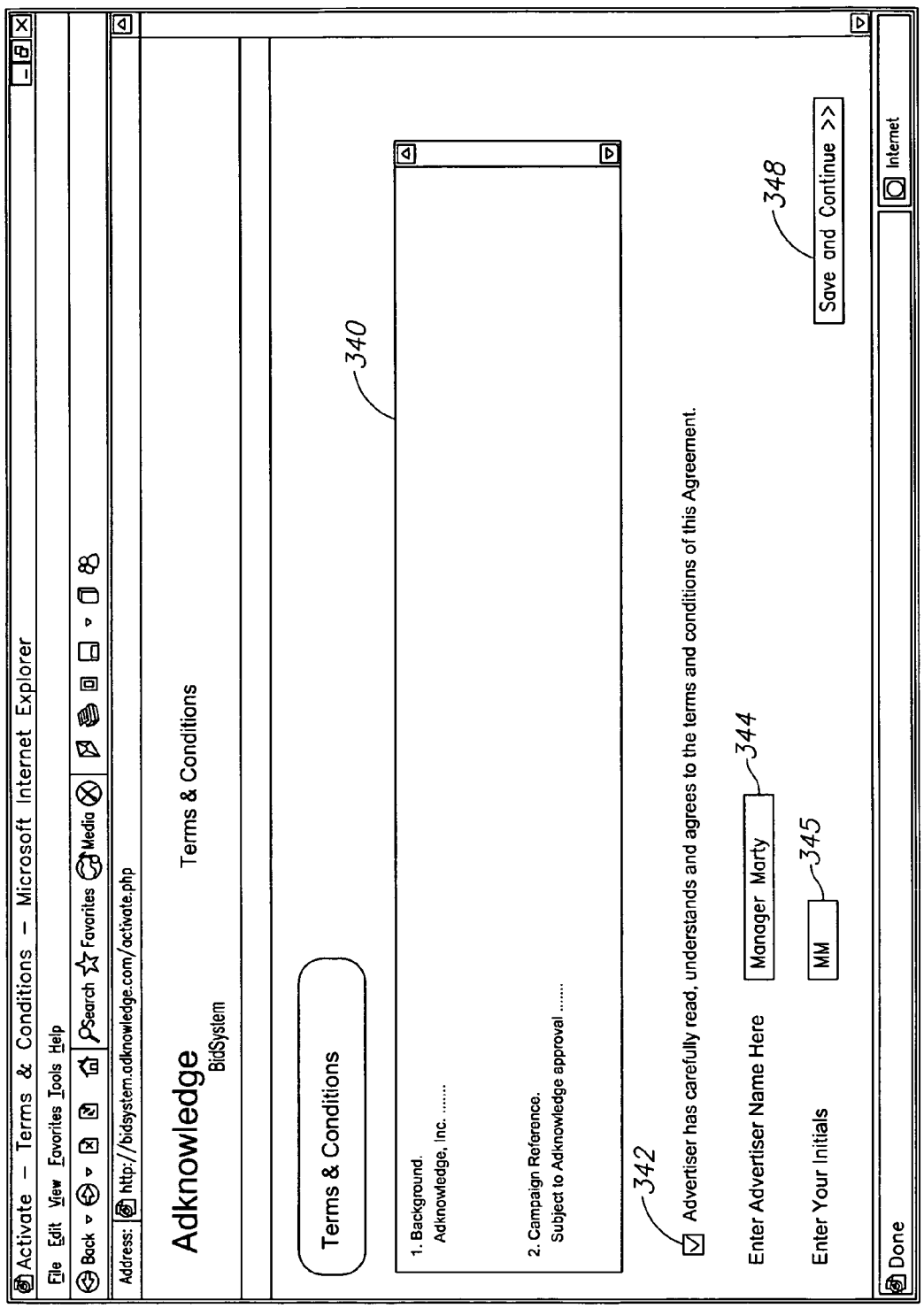
Figure 16:
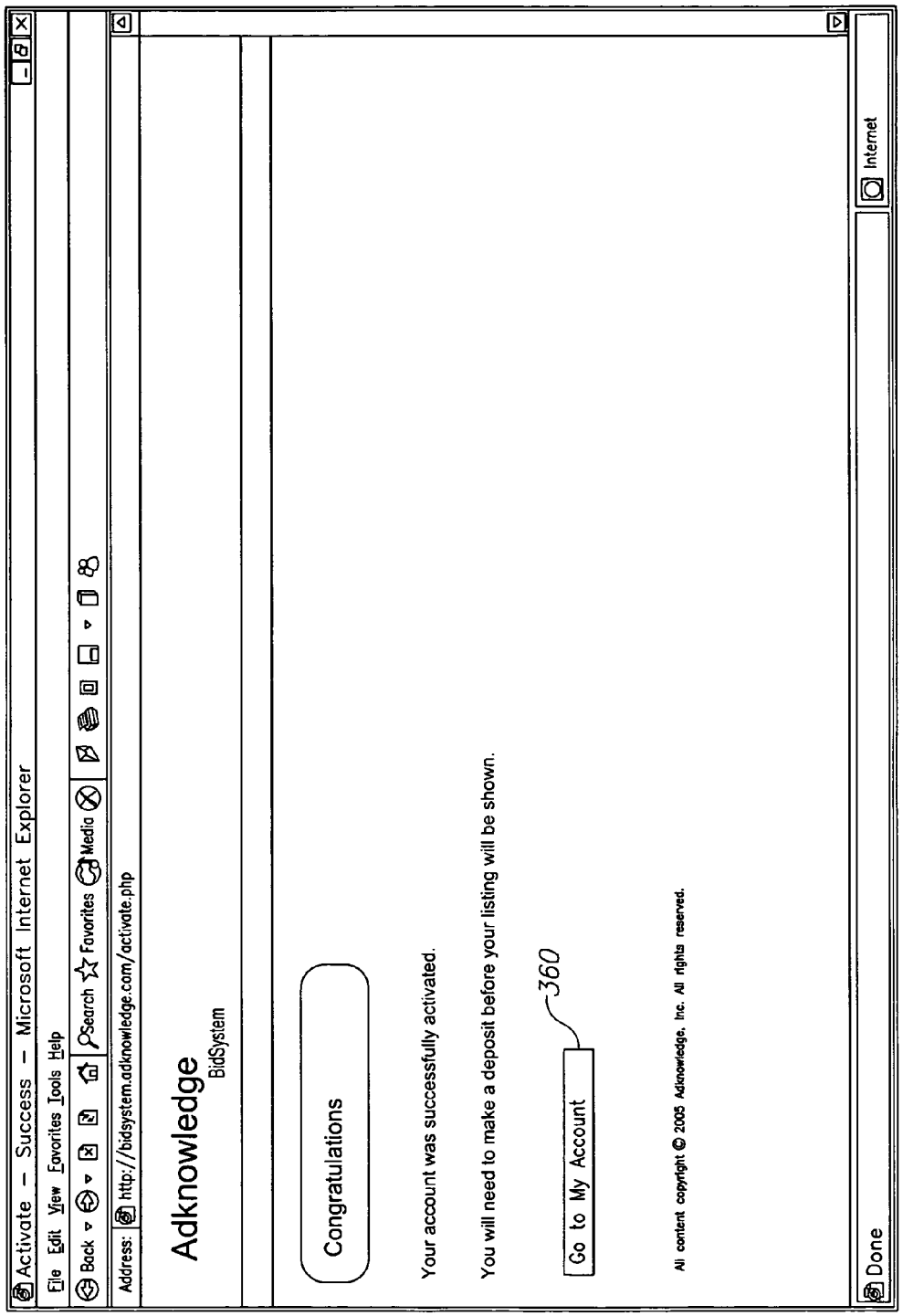

For example, as shown in the screen display of FIG. 15, terms and conditions for creating and maintaining a campaign on the system are listed in a box 340. There is also a check box 342 to indicate acknowledgement and acceptance of the terms, as well as boxes for the advertising user to input their name 344 and initials 345. A box 348, that when clicked on to continue the process is also part of the screen display.

With the terms and conditions accepted, the advertising user's account is activated, such that the advertising user is permitted to enter the system, at block 128. Acknowledgement of the activation is shown, for example, in the screen display of FIG. 16. The user may now access their account, by clicking on the box 360 for account access.

With the campaign and account associated therewith now created, and typically stored in the system, it is typically reviewed by the system administrators. Once the review is complete, the campaign is taken off suspension and activated in the system 50. The now-activated campaign is ready for distribution to users, in e-mails, banners and the like, over networks, such as wide area networks and public networks, such as the Internet, as detailed below.

The process ends at block 130.

If the advertising user wants to establish another account with other categories and creatives, they start the process again, by returning to block 101. This is because the system 50 is typically programmed to only allow a single campaign to be created at any given time.

Turning to FIG. 17, there is shown an exemplary screen display for account or campaign management. There are tabs 401-407 for various aspect of account management, including modifying existing account parameters, for example, bid amounts. The tabs, when clicked on will being up screen displays, with clickable links for campaign management 401 (the screen display of FIG. 17), reporting 402, each advertising user's individual account 403, a campaign group summary 404, a budget overview 405, setup a new campaign 406, and, search campaigns for the same advertising user 407.

In an exemplary operation, the rules and policy processor 60, coupled with the bidding engine 54, determines the requisite categories, for which e-mails and banners will be sent to various users (e-mail) or web pages (banners) over the Internet. Typically, there are two or more different accounts, each account with corresponding creative(s), for one particular category. Hence, the system 50 must determine which creative to send (in e-mail and/or banners). For example, in a basic scenario, for a category that has been selected by the system 50, the creative for the account with the highest click through or pay per click value at the present time, as entered into the bidding engine 54 by the advertising user, for the particular category, is sent. The bidding engine 54 determines the creative associated with the highest click through or pay per click value by ordering at least two creatives for that category into a priority order and ranking the creatives, such that the highest ranked creative or creatives are sent over the requisite channels (e-mail and/or web). The ordering of the creatives may also be controlled by the main processor 58 and/or the rules and/or policies processor 60 in cooperation with the bidding engine 54.

Figure 20:
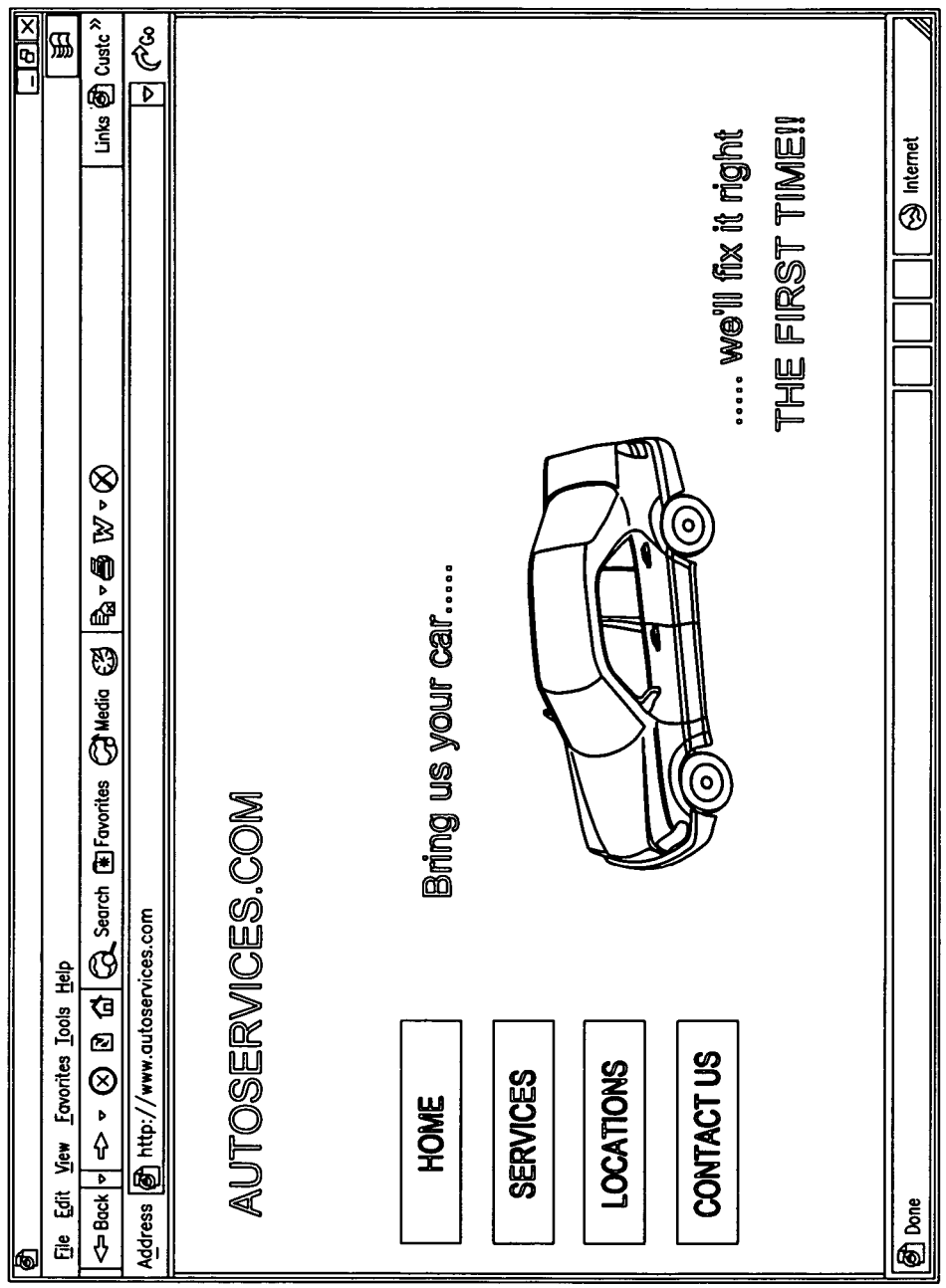
FIG. 20 is an example of a target web site reached in accordance with embodiments of the invention.
Figure 21:
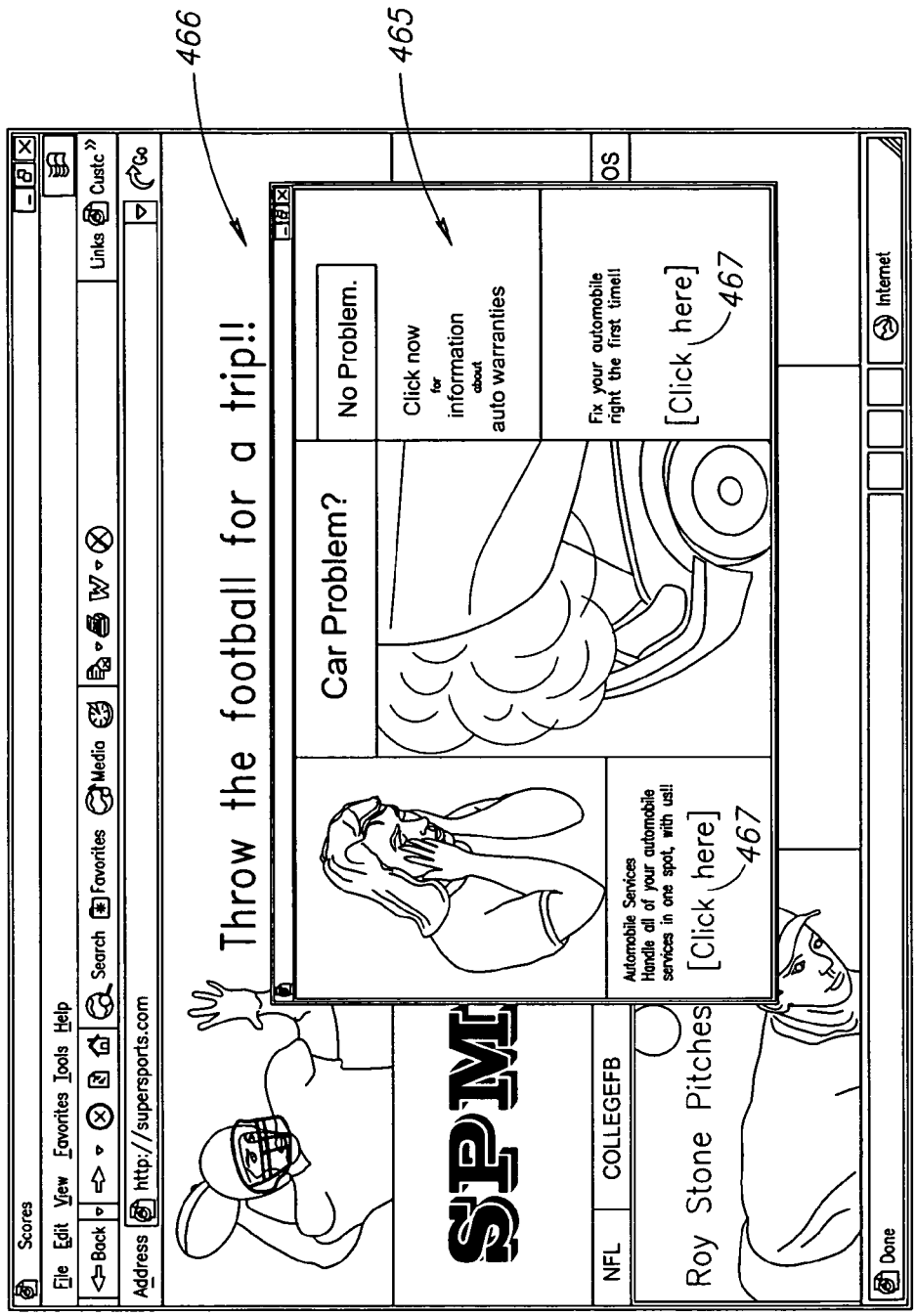
FIG. 21 is an exemplary banner in accordance with an embodiment of the invention; and, FIGS. 22 and 23 are another exemplary banner in accordance with an embodiment of the invention.
Figure 22:
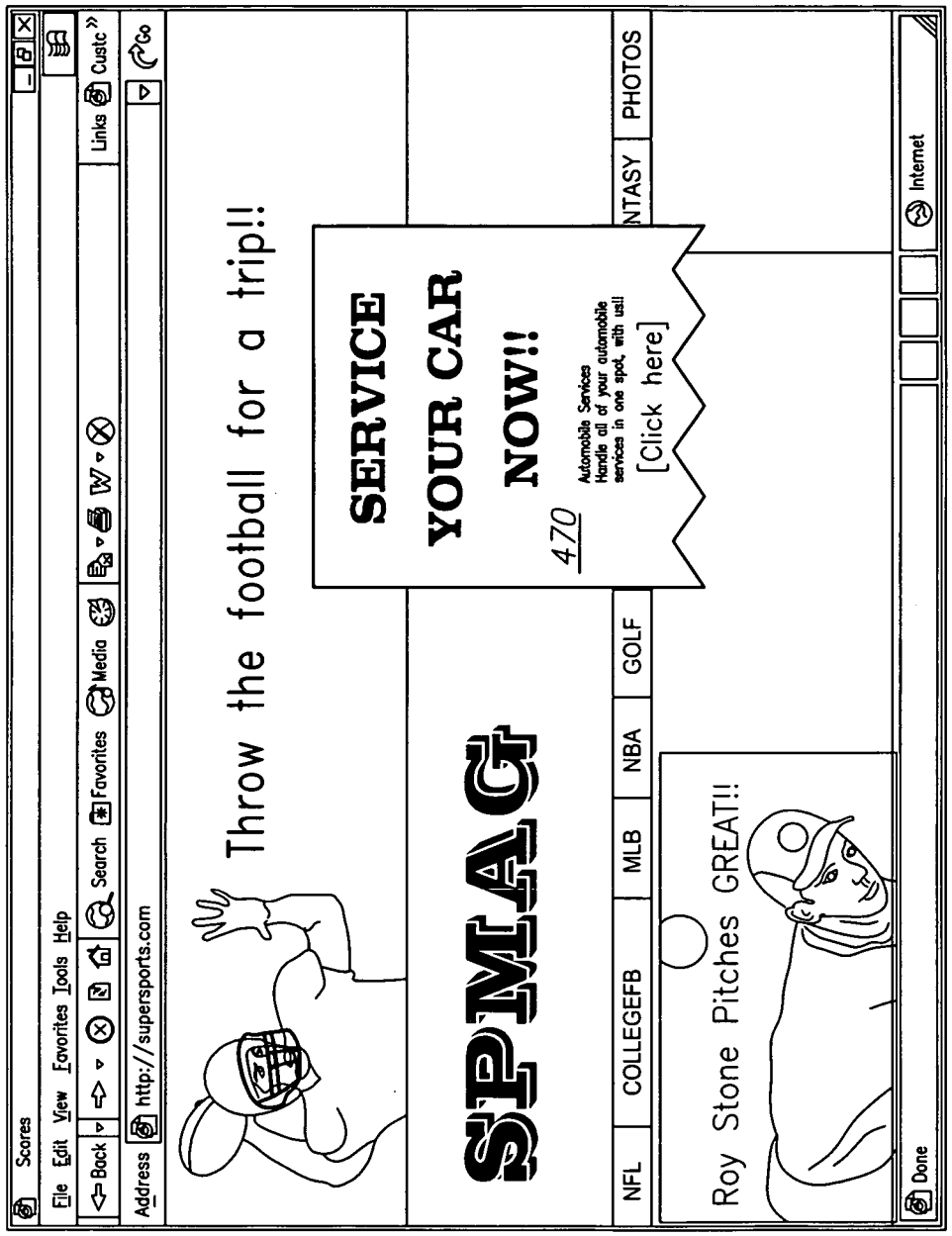
Figure 23:
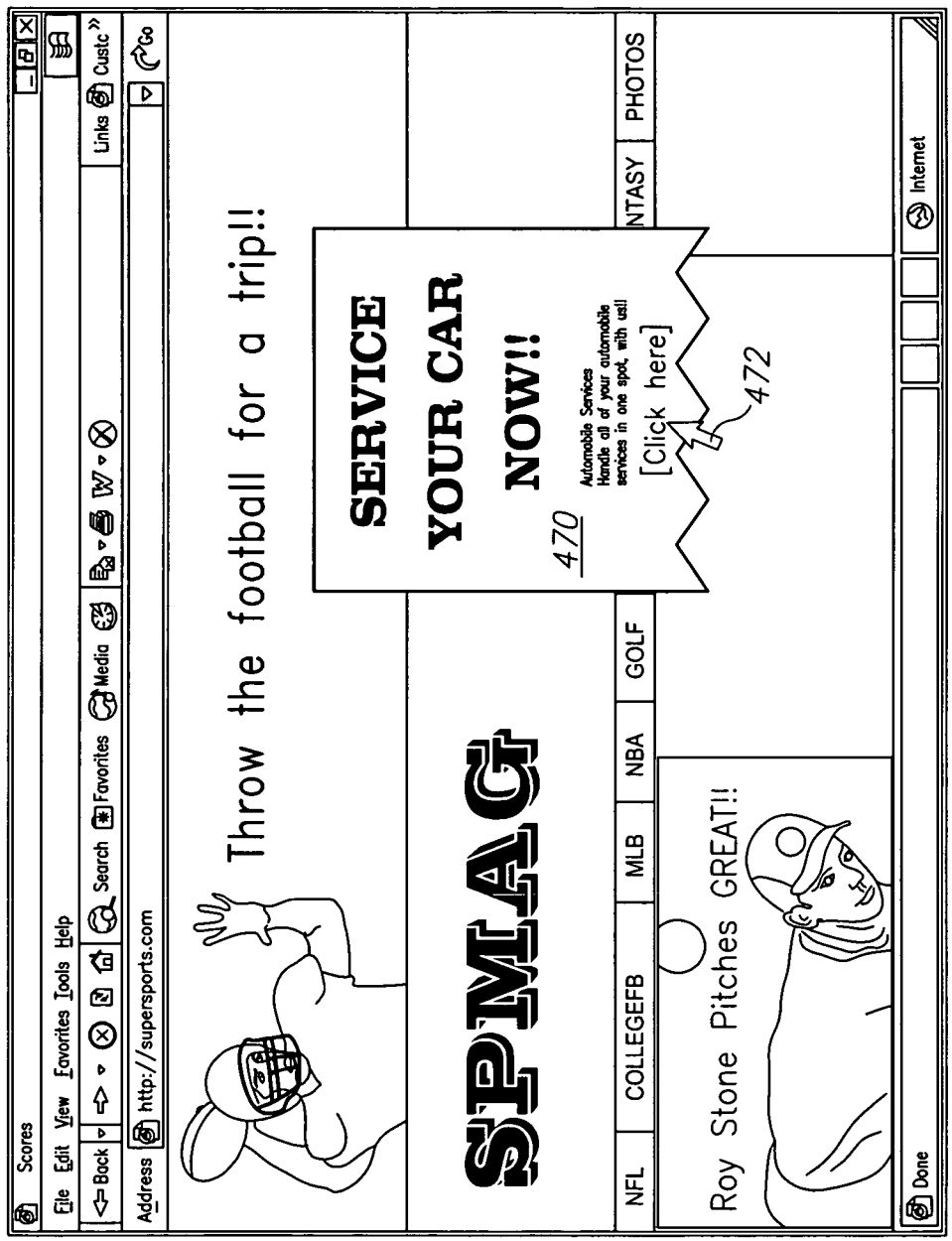

In the case of the e-mail channel, an e-mail is sent from the home server (HS) 30 to the mailbox (e-mail client) of the requisite user, for example, users 40b (user1@abc.com), 40b' (user2@ggg.com). The e-mail appears in the user's mail box (IN Box), as shown by the text line 460 in FIG. 18. The e-mail is in accordance with the e-mails above, and once opened by clicking as per the arrow 462, a template (as stored in sub-database 75 of FIG. 1B) is received from the home server (HS) 30 and the creative of the corresponding advertising user is built out in the template, so that there is at least one link underlying a button, for example, indicated by "Click here" 464 in the screen display of FIG. 19. Once this button 464 is clicked by the user, for example, users 40b and/or 40b', the link is activated and the user's browser is directed to the targeted web site associated with the advertising user, for example, having the URL, www.autoservices.com, as shown in FIG. 20. This web site is hosted, for example, by any one of the third party servers (TPS) 42a-42n.

In the case of the web channel, a banner 465, formed of the requisite creative for the requisite category, in a banner template (as stored in the sub-database 76 of FIG. 1B) sent by the home server (HS) 30 (the banner module 52), to the web page 466, appears in a web page 466 being viewed by the requisite user, for example, users 40b, 40b'. The banner 465 appears on the web page 466, as shown by the screen display of FIG. 21. The banner 465 is then clicked on (by the user clicking their mouse at either of the boxes 467, indicated by "Click here"). Once a "Click here" box 467 is clicked by the user, for example, users 40b and/or 40b', the link underlying the box 467 is activated and the user's browser is directed to the targeted web site associated with the advertising user. This targeted web site may be, for example, the web site of FIG. 20.

Also, with the web channel, a banner 470 (sent to a web page by the banner module 52) appears in a web page being viewed by the requisite user, for example, users 40b, 40b'. The banner 470 ("SERVICE YOUR CAR NOW") appears on the web page as shown by the screen display of FIG. 22. The banner 470 is then clicked on, as shown on the screen display of FIG. 23. The user's click is indicated by the arrow 472 over the "Click here" box 474. The click 472 activates the underlying link, and the user's browser is directed to the targeted web site associated with the advertising user. This targeted web site may be, for example, that of FIG. 20.

While the above operational examples of FIGS. 18-23 describe a basic system of traffic control, in directing users browsers to targeted web sites, other traffic control schemes are also possible. For example, traffic may be controlled by programming rules and policies into the rules and policy processor 60 of the system 50 as detailed above, through the module 80, as well as by programming the main processor 58.

While there are endless possibilities for traffic control, traffic control typically allows a creative to be sent, and its associated budget used up over a time period, as opposed to a short time. For example, if a single category has at least six bids, associated with six advertisers, each with a creative for that category, for every 100 sendings of the creatives for that particular category, the advertiser or account with the highest bid (of the six advertisers or accounts selected in accordance with the rules policies of the system 50) has their creative sent (typically from the home server (HS) 30, in the form of an e-mail or banner, or both, as detailed above) 50 times. The advertiser with the second highest bid has their creative sent 25 times. The advertiser with the third highest bid has their creative sent 12 times. The advertiser with the fourth highest bid has their creative sent 7 times. The advertiser with the fifth highest bid has their creative sent 4 times, while the advertiser with the sixth highest bid has their creative sent twice.

For example, in 100 sendings, the creatives could be sent in a straight order, 50-25-12-7-4-2, or randomly placed, such that the aforementioned amount of sendings of each creative will be made within the 100 random sendings. This sending may continue for as long as desired (programmed into the system 50), and typically continues until all budgets, associated with each advertiser (account), corresponding to the requisite creative, are exhausted.

The system 50, also monitors fraudulent clicks, so that only valid clicks result in the debiting of the account associated with the sent creative, whose underlying link was activated by a click. For example, if a creative, either opened in an e-mail, or sent in a banner, has an underlying link activated, by a click on the overlying box, any subsequent clicks on the same box (that overlies the clicked link to the URL of the targeted web site) will not be recorded as click throughs. Although the user's browser may be directed to the targeted web site, the advertiser's account, associated with the clicked on box on the creative, will not be debited for this subsequent click, regardless if it results in a click through. This click is considered to be a fraudulent or invalid click.

The above-described processes including portions thereof can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A method for distributing electronic communications by a computer over a computer network, the computer linked to the computer network, the method comprising:
   maintaining a database including a plurality of categories associated with the computer;
   maintaining a database of modifiable communications, each of the modifiable communications provided by the computer, the database including at least one modifiable communication for each category of the plurality of categories associated with the computer, each modifiable communication configured for being transmitted over the computer network;
   the computer receiving input from users over the computer network, the input including the designation of a category, text for a modifiable communication, a Uniform Resource Locator for a targeted web site on the computer network associated with the user, for the modifiable communication, and a plurality of modifiable bid amounts for the designated category corresponding to the modifiable communication associated with the user, a first bid amount of the plurality of modifiable bid amounts associated with an e-mail distribution channel for the modifiable communication and a second bid amount of the plurality of modifiable bid amounts associated with a web distribution channel for the modifiable communication;
   the computer creating at least one operable communication for transmission over the computer network, by providing the inputted text and the Uniform Resource Locator into the at least one modifiable communication for the category designated by the user to create the at least one operable communication associated with the user, the at least one operable communication, when activated by a recipient, is configured for directing the browsing application of a computer associated with the recipient to the targeted web site corresponding to the uniform resource locator, over the computer network; and,
   maintaining a database of the modifiable bid amounts for each category associated with the computer, each modifiable bid amount corresponding to each operable communication associated with each user; and,
   the computer selecting the at least one operable communication for transmission to a destination over the computer network for a recipient, the selection of the at least one operable communication from a category selected by the computer.

2. The method of claim 1, wherein the computer selecting the at least one operable communication for transmission to a destination over the computer network is initiated by the computer, and the computer selects a channel for the transmission of the at least one operable communication, the channel including one of the e-mail channel or the web channel.

3. The method of claim 2, wherein the at least one operable communication is in the form of an e-mail, if the e-mail channel is selected.

4. The method of claim 2, wherein the at least one operable communication is in the form of a banner, if the web channel is selected.

5. The method of claim 1, wherein each category of the plurality of categories includes at least one word or word group.

6. The method of claim 1, wherein each category of the plurality of categories includes at least a plurality of individual words or word groups.

7. The method of claim 1, wherein each of the modifiable communications includes a portion of predetermined content retrieved from storage media.

8. The method of claim 1, wherein the operable communication includes computer code for directing the browsing application of a computer associated with the recipient to the targeted web site corresponding to the uniform resource locator, over the computer network, when the recipient activates the operable communication.

9. The method of claim 1, wherein the at least one modifiable communication for each category of the plurality of categories includes a plurality of modifiable communications for each category of the plurality of categories.

10. The method of claim 1, wherein the user includes an advertiser or an entity associated with the advertiser.

11. A computer system for distributing electronic communications over a computer network, the computer system comprising:
   a database including at least one category;
   a database including a plurality of communications provided by the computer system for the at least one category, each of the communications associated with a user and including a link to direct a browsing application of a computer, associated with a recipient of one of the communications, to a targeted address on the computer network, the link provided by the user, and each of the communications configured for being transmitted to a destination over the computer network;
   a database of modifiable bid amounts for the at least one category, a first bid amount of the modifiable bid amounts associated with an e-mail distribution channel for a first communication in the at least one category and a second bid amount of the modifiable bid amounts associated with a web distribution channel for the first communication in the at least one category;
   a bidding engine for ordering each of the communications associated with each user, in accordance with the modifiable bid amounts, into an order for the at least one category;
   a computerized component for initiating the selecting of a category from the at least one category; and
   a computerized component for selecting a communication from the selected category from the order for transmission to a destination for a recipient over the computer network.

12. The computer system of claim 11, additionally comprising: an e-mail module for sending the selected communication to an e-mail client, the e-mail client defining the destination.

13. The computer system of claim 11, additionally comprising: a banner module for sending the selected communication to a web page, the web page defining the destination.

14. The computer system of claim 11, wherein the at least one category includes a plurality of categories.

15. The computer system of claim 11, wherein the bidding engine for ordering each of the communications associated with each user, in accordance with the modifiable bid amounts, creates the order by ranking the communications associated with each by modifiable bid amounts for the at least one category.

16. The computer system of claim 15, wherein the computerized component for selecting a communication from the order for distribution to a destination for a recipient over the computer network is configured for selecting the communication of the highest rank in the order based on the modifiable bid amount associated with the communication.

17. The computer system of claim 11, wherein the user includes an advertiser or an entity associated with the advertiser.

18. The computer system of claim 11, wherein each of communications includes an image template provided by the computer system.

19. A computer system for distributing electronic communications over a computer network, the computer system comprising:
   a database including at least one category;
   a database including a plurality of communications provided by the computer system for the at least one category, each of the communications associated with a user and including a link to direct a browsing application of a computer associated with a recipient of one of the communications to a targeted address on the computer network, the link provided by the user, and each of the communications configured for being transmitted to a destination over the computer network;
   a database of modifiable bid amounts for the at least one category for at least one of an e-mail channel or a web channel, a first bid amount of the modifiable bid amounts associated with an e-mail distribution channel for a first communication in the at least one category and a second bid amount of the modifiable bid amounts associated with a web distribution channel for the first communication in the at least one category;
   a bidding engine for ordering each of the communications associated with each user, in accordance with the modifiable bid amounts, for a category, for at least one of the e-mail channel or the web channel;
   a computerized component for initiating the selecting of a category from the at least one category; and
   a computerized component for selecting a communication from the selected category from the order for transmission to a destination for a recipient over the computer network.

20. The computer system of claim 19, additionally comprising: an e-mail module for sending the selected communication to an e-mail client over the e-mail channel, the e-mail client defining the destination.

21. The computer system of claim 19, additionally comprising: a banner module for sending the selected communication to a web page, the web page defining the destination.

22. The computer system of claim 19, wherein the at least one category includes a plurality of categories.

23. The computer system of claim 19, wherein the bidding engine for ordering each of the communications associated with each user, in accordance with the modifiable bid amounts, creates the order by ranking the communications associated with each by modifiable bid amounts for the at least one category.

24. The computer system of claim 23, wherein the computerized component for selecting a communication from the order for distribution to a destination for a recipient over the computer network is configured for selecting the communication of the highest rank in the order based on the modifiable bid amount associated with the communication.

25. The computer system of claim 19, wherein the user includes an advertiser or an entity associated with the advertiser.

26. The computer system of claim 19, wherein each of communications includes an image template provided by the computer system.

27. A system for distributing electronic communications over a computer network comprising:
   a database including a plurality of categories;
   a database including a plurality of modifiable communications, each of the modifiable communications provided by the system, at least one modifiable communication of the plurality of modifiable communications for each category of the plurality of categories;
   a processor programmed to:
      receive input from users over the computer network including, the designation of a category, text, a Uniform Resource Locator for a targeted web site associated with the user and the resulting operable communication associated with the user, and, a plurality of modifiable bid amounts for the category designated, a first bid amount of the plurality of modifiable bid amounts associated with an e-mail distribution channel for the modifiable communication and a second bid amount of the plurality of modifiable bid amounts associated with a web distribution channel for the modifiable communication; and,
      create at least one operable communication for transmission over the computer network, by providing the inputted text and the Uniform Resource Locator into the at least one modifiable communication for the designated category, to create the at least one operable communication for the determined category associated with the user, the at least one operable communication for transmission by the system to a destination over the computer network; and,
   a bidding engine configured for receiving the modifiable bid amounts for each category designated by each user, each modifiable bid amount corresponding to each of the operable communications associated with each user, and ordering each of the operable communications associated with each user into an order for each category in accordance with the modifiable bid amounts provided by each user.

28. The system of claim 27, wherein the bidding engine is additionally configured to order the operable communications associated with each user for each category of the plurality of categories in accordance with the modifiable bid amounts, in accordance with a channel over which the each communication associated with each user is to be distributed.

29. The system of claim 28, wherein the channel includes at least one of an e-mail channel and a web channel, and the system additionally comprises:
   an e-mail module for sending operable communications over the e-mail channel; and,
   a banner module for sending operable communications over the web channel.

30. The system of claim 29, additionally comprising: a processor programmed to select a category from the plurality of categories from which an operable communication will be selected for distribution to a destination over the computer network.

31. The system of claim 30, wherein the bidding engine for ordering each of the operable communications associated with each user, in accordance with the modifiable bid amounts, creates the order by ranking the operable communications associated with each by modifiable bid amounts for the at least one category.

32. The system of claim 31, additionally comprising: a processor programmed to select the highest ranked operable communication from the operable communications of the selected category for distribution to a destination for a recipient over the selected channel over the computer network.

33. The system of claim 27, wherein the user includes an advertiser or an entity associated with the advertiser.

34. A method for distributing electronic communications by a computer system over a computer network, the computer system linked to the computer network, the method comprising:
- maintaining a database in the computer system including at least one category;
- maintaining a database including a plurality of communications provided by the computer system for the at least one category in the computer system, each of the communications associated with a user, and including a link to direct a browsing application of a computer, associated with a recipient of one of the communications, to a targeted address on the computer network, the link provided by the user, and each of the communications configured for being transmitted to a destination over the computer network;
- maintaining a database of modifiable bid amounts for the at least one category in the computer system, a first bid amount of the modifiable bid amounts associated with an e-mail distribution channel for a first communication in the at least one category and a second bid amount of the modifiable bid amounts associated with a web distribution channel for the first communication in the at least one category;
- the computer system initiating the selecting of one category of the at least one category;
- the computer system ranking each of the communications in an order, in accordance with the modifiable bid amounts, for the selected category; and
- the computer system selecting one of the communications from the selected category from the order for transmission to a destination for a recipient over the computer network.

35. The method of claim 34, wherein selecting one of the communications includes selecting the communication having the highest rank in the order and the computer system sending the selected communication to the destination.

36. The method of claim 35, wherein the destination includes an e-mail client.

37. The method of claim 35, wherein the destination includes at least one web page.

38. The method of claim 35, wherein the modifiable bid amounts for the at least one category include modifiable bid amounts for at least one of an e-mail channel or a web channel.

39. The method of claim 38, wherein the at least one communication of the highest rank in the order is placed into an e-mail if the modifiable bid amount is for the e-mail channel.

40. The method of claim 39, wherein the e-mail is sent to an e-mail client, the e-mail client defining the destination.

41. The method of claim 38, wherein the at least one communication of the highest rank in the order is placed into a banner if the modifiable bid amount is for the web channel.

42. The method of claim 41, wherein the banner is sent to a web page, the web page defining the destination.

43. The method of claim 34, wherein the targeted address includes a target web site associated with the user associated with each communication.

44. The method of claim 34, wherein the at least one category includes at least one word or word group.

45. The method of claim 34, wherein the at least one category includes at least a plurality of individual words or word groups.

46. The method of claim 34, wherein the at least one category includes a plurality of categories.

47. The method of claim 34, wherein the user includes an advertiser or an entity associated with the advertiser.

48. The method of claim 34, wherein each of communications includes an image template provided by the computer system.

49. A method for distributing electronic communications by a computer system over a computer network, the computer system linked to the computer network, the method comprising:
- maintaining a database in the computer system including at least one category;
- maintaining a database including at least one communication provided by the computer system for the at least one category in the computer system, each communication associated with a user, and including a link to direct a browsing application of a computer, associated with a recipient of one of the communications, to a targeted address on the computer network, provided by the user, and each of the communications configured for being transmitted to a destination over the computer network;
- maintaining a database of modifiable bid amounts for the at least one category in the computer system, a first bid amount of the modifiable bid amounts associated with an e-mail distribution channel for a first communication in the at least one category and a second bid amount of the modifiable bid amounts associated with a web distribution channel for the first communication in the at least one category;
- the computer system initiating the selecting of one category of the at least one category;
- the computer system ranking each communication in an order, for the selected category; and
- the computer system selecting one communication from the selected category from the order for transmission to a destination for a recipient over the computer network.

50. The method of claim 49, additionally comprising, the computer system sending the selected communication to a destination for a recipient over the computer network.

51. The method of claim 49, wherein the ranking each communication in an order is in accordance with the modifiable bid amount, and selecting the one communication includes selecting the communication with the highest rank.

52. The method of claim 51, additionally comprising, the computer system sending the selected communication to a destination for a recipient over the computer network over at least one of an e-mail channel or a web channel.

53. The method of claim 49, wherein the targeted address includes a target web site associated with the user associated with each communication.

54. The method of claim 49, wherein the user includes an advertiser or an entity associated with the advertiser.

55. The method of claim 49, wherein the at least one communication includes a plurality of communications.

56. The method of claim 55, wherein each of communications includes an image template provided by the computer system.

* * * * *